United States Patent
Choudhuri et al.

(10) Patent No.: US 8,606,712 B2
(45) Date of Patent: *Dec. 10, 2013

(54) MULTI-STAGE FILTERING FOR FRAUD DETECTION WITH ACCOUNT EVENT DATA FILTERS

(75) Inventors: Somnath Choudhuri, Newark, DE (US); Daniel Bodalski, Mullica Hill, NJ (US); Matthew Hoke, Audubon, NJ (US); Sethu V. Iyer, Kennett Square, PA (US); Charles Pigg, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/188,128

(22) Filed: Jul. 21, 2011

(65) Prior Publication Data
US 2013/0024373 A1    Jan. 24, 2013

(51) Int. Cl.
*G06Q 40/00* (2012.01)
(52) U.S. Cl.
USPC .............................................. 705/42; 705/30
(58) Field of Classification Search
USPC ..................................................... 705/10–44
See application file for complete search history.

(56) References Cited

U.S. PATENT DOCUMENTS

| | | | |
|---|---|---|---|
| 7,376,618 B1 * | 5/2008 | Anderson et al. | 705/38 |
| 7,578,438 B2 * | 8/2009 | Hogg et al. | 235/380 |
| 7,809,650 B2 * | 10/2010 | Bruesewitz et al. | 705/64 |
| 7,860,783 B2 * | 12/2010 | Yang et al. | 705/38 |
| 7,941,370 B2 * | 5/2011 | Paulsen et al. | 705/39 |
| 8,032,449 B2 * | 10/2011 | Hu et al. | 705/38 |
| 8,065,233 B2 * | 11/2011 | Lee et al. | 705/44 |
| 8,233,673 B2 * | 7/2012 | Britz et al. | 382/117 |
| 2009/0307028 A1 * | 12/2009 | Eldon et al. | 705/7 |
| 2011/0131131 A1 * | 6/2011 | Griffin et al. | 705/38 |
| 2011/0184778 A1 * | 7/2011 | Graepel et al. | 705/7.31 |
| 2011/0238564 A1 * | 9/2011 | Lim et al. | 705/38 |
| 2011/0251951 A1 * | 10/2011 | Kolkowitz et al. | 705/39 |
| 2012/0109802 A1 * | 5/2012 | Griffin et al. | 705/35 |

\* cited by examiner

*Primary Examiner* — Frantzy Poinvil
(74) *Attorney, Agent, or Firm* — Michael A. Springs; Moore & Van Allen PLLC; Padowithz Alce

(57) ABSTRACT

A multi-stage filtering process and system for fraud detection is disclosed. The process includes one or more preliminary filtration stages followed by one or more additional filtration stages that provide for enhanced screening for fraudulent activity. In one such embodiment the preliminary filtration provides for evaluating financial transactions based on financial transaction attribute data and secondary filtration provides for further evaluating the financial transactions based on a customer's account event data. Over a plurality of transactions, a portion of the transactions are cleared for processing (e.g., deemed not likely fraudulent or of too low value to continue processing) after each filtration stage. As such, acceptable transactions are not unnecessarily scrutinized. In specific embodiments, filtration is based on financial transaction data and account event data.

48 Claims, 17 Drawing Sheets

MULTI-STAGE FILTERING FOR FRAUD DETECTION WITH ACCOUNT EVENT DATA FILTERS

BACKGROUND

With the advancement of technology, fraud is a growing concern. As such, it has become increasingly important to protect customers from misappropriation of identity. Conventional fraud detection systems generally analyze each transaction (or types of transactions) in the same manner. As such, gaps in conventional fraud detection techniques have been exploited leading to the processing of fraudulent transactions. Conversely, in many instances, in an attempt to eliminate as many fraudulent transactions as possible, conventional fraud detection systems are too strict, resulting in false-positive identifications of fraud and increased data storage costs. False-positives fraud identifications lead to legitimate transactions being declined causing loss of revenue to the financial institution as well as heightened consumer frustration. As such, a need currently exists for an improved system for fraud detection.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the invention address the above needs and/or achieve other advantages by providing apparatuses (e.g., a system, computer program product, and/or other device), methods, or a combination of the foregoing for multi-stage filtering for fraud detection.

The present invention provides for a more efficient manner by which financial institutions and the like can detect fraud, and in some embodiments prevent fraud from occurring. Efficiency is realized by analyzing only those transactions that are highly likely to be a fraud concern based on filtering the transactions prior to fraud analysis. The filtering may be based on (1) traditional transaction data, such as transaction amount or the like, and (2) non-transaction account event data, such as account event data, for example, account authorization/password changes; financial product orders/re-orders, such as check or debit/credit card orders; account balance inquires; changes to account or customer profile account data, such as mailing address; online or mobile banking session data and the like. The non-transaction account event data is highly instrumental in aiding the process of fraud detection and/or protection, in that, certain identifiable account-related events, such as password changes, financial product orders/re-orders typically coincide with the occurrence of financial fraud.

A method for fraud analysis defines first embodiments of the invention. The method includes receiving financial transaction attribute data associated with one or more financial transactions. Each transaction is related to one or more customer financial accounts. The method further includes executing a first stage fraud filtration configured to evaluate the financial transactions based on the financial transaction attribute data. The method further includes receiving account event data associated with one or more events pertaining to one or more financial accounts and executing a second stage fraud filtration configured to evaluate the financial transactions based on the account event data. In addition, the method includes determining which of the financial transactions warrant fraud detection-related actions based on the first and second stage fraud filtrations.

In specific embodiments of the method, receiving account event data further defines the account event data as account authorization credential change data associated with a user's request to change at least one of an account used identification or an account password, financial product order data associated with a user's request to order a financial product, wherein the financial product includes one of personal checks, a debit card, or a credit card and/or account opening data associated with a user's request to open a financial account.

In other specific embodiments of the method, receiving account event data further defines the account event data as banking session-related data associated with one of a user's online banking session, a user's mobile banking session, a user's automated teller machine (ATM) session or a user's call center session.

In still further related embodiments of the method, receiving account event data further defines the account event data as account personal information change data associated with a user's request to change personal information associated with one of a financial account or a customer profile account. Moreover, the account event data may include financial account balance inquiry data associated with a user requesting a balance for one or more financial accounts and/or event location-identifying data that provides for identifying a geographic location of an event associated with the event data.

In further specific embodiments of the method, receiving financial transaction attribute data further includes receiving financial transaction attribute data associated with at least one of a plurality of financial institution transaction products, a plurality of financial institution transaction channels or a plurality of financial institution transaction applications. In additional related embodiments of the method, receiving financial transaction attribute data further includes receiving financial transaction velocity data associated with a rate at which a plurality of financial transactions occur.

In other specific embodiments the method further includes receiving related account data that identifies related financial accounts that are associated by customer name with each of the one or more financial accounts. In such embodiments the method may further include executing third stage fraud filtration configured to evaluate the financial transactions based on the related account data.

In still further specific embodiments the method includes receiving customer data for a customer associated with each of the one or more customer financial accounts. In such embodiments the method may include executing a third stage fraud filtration configured to evaluate the financial transactions based on the customer data.

Moreover, in additional specific embodiments the method includes executing a fourth stage fraud filtration configured to evaluate the one or more events based on the financial transaction data and/or a fifth stage fraud filtration configured to evaluate the one or more events based on the account event data.

In still further specific embodiments the method determining may include one or more of further filtering, automatic generation and communication of a fraud alert, fraud detection-related scoring or decisioning or the like. In still further embodiments of the method determining may include determining which of the financial transactions warrant fraud prevention-related actions, such as temporarily halting credit/ debit card transactions and/or access to accounts, stopping payment on checks, and the like.

An apparatus for fraud analysis defines second embodiments of the invention. The apparatus includes a computing platform including a memory and at least one processor in communication with memory. The apparatus further includes a fraud analysis filtration module stored in the memory, executable by the processor and configured to receive financial transaction attribute data associated with one or more financial transactions and account event data associated with one or more events pertaining to one or more financial accounts. The module is further configured to execute a first stage fraud filtration to evaluate the financial transactions based on the financial transaction attribute data and a second stage fraud filtration to evaluate the financial transactions based on the account event data. In addition, the module is configured to determine which of the financial transactions warrant fraud detection-related actions based on the first and second stage fraud filtrations.

A computer program product including a non-transitory computer-readable medium. The computer-readable medium includes a first set of codes for causing a computer receive financial transaction attribute data associated with one or more financial transactions, each transaction related to one or more customer financial accounts and a second set of codes for causing a computer to execute a first stage fraud filtration configured to evaluate the one or more financial transactions based on the financial transaction attribute data. The computer-readable medium also includes a third set of codes for causing a computer to receive account event data associated with one or more events pertaining to one or more financial accounts and a fourth set of codes for causing a computer to execute a second stage fraud filtration configured to evaluate the one or more financial transactions based on the account event data. In addition, the computer-readable medium includes a fifth set of codes for causing a computer to determine which of the financial transactions warrant fraud detection-related actions based on the first and second stage fraud filtrations.

As discussed in more detail below, the present invention provides for a more efficient manner by which financial institutions and the like can detect, and in some embodiments prevent fraud from occurring. Efficiency is realized by analyzing only those transactions that are highly likely to be a fraud concern based on filtering the transactions with (1) transaction data, such as transaction amount or the like, and (2) account event data, such as account authorization/password changes; financial product orders/re-orders, such as check or debit/credit card orders; account balance inquires; changes to account or customer profile account data, such as mailing address; online or mobile banking session data and the like.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
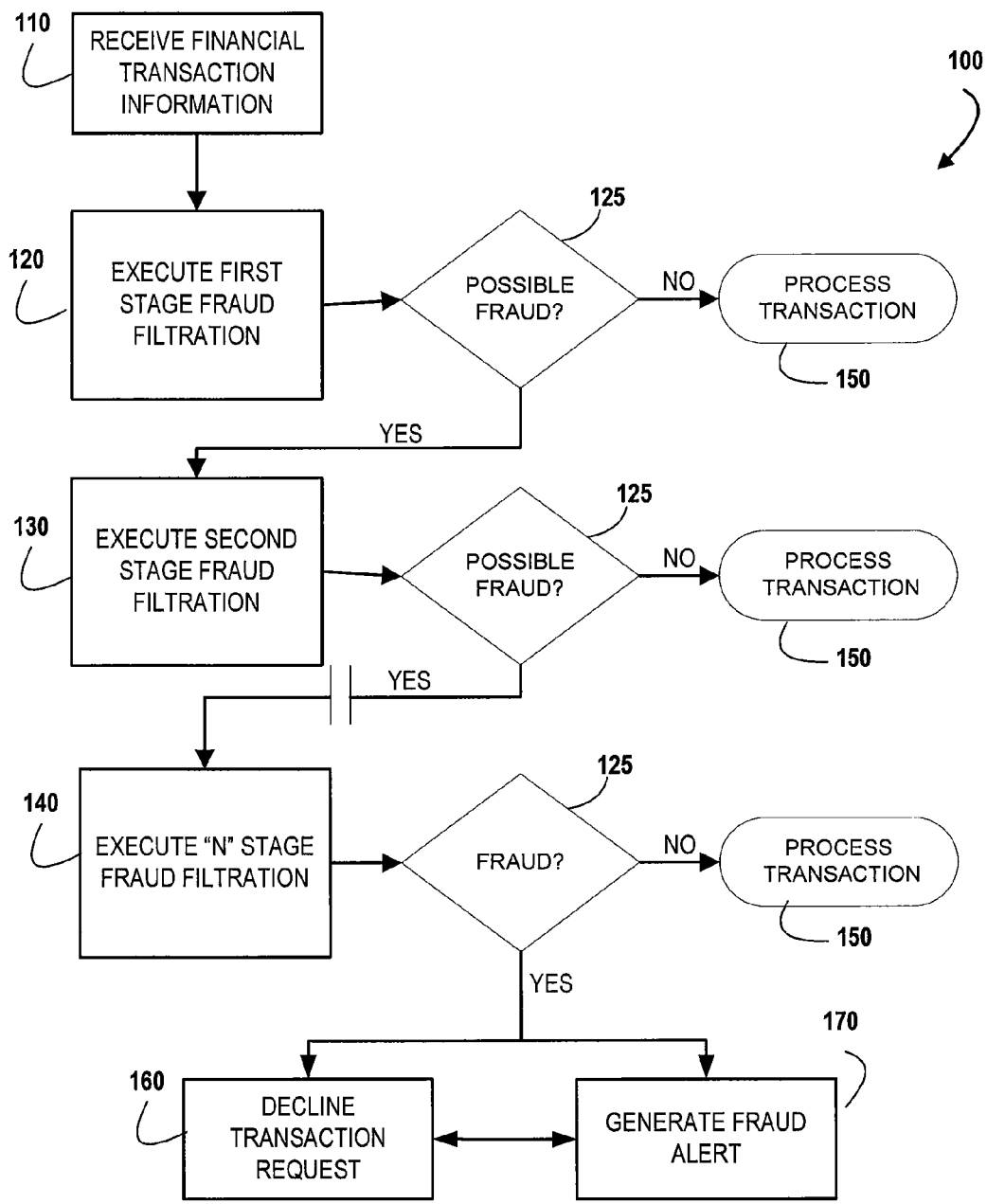
Figure 2:
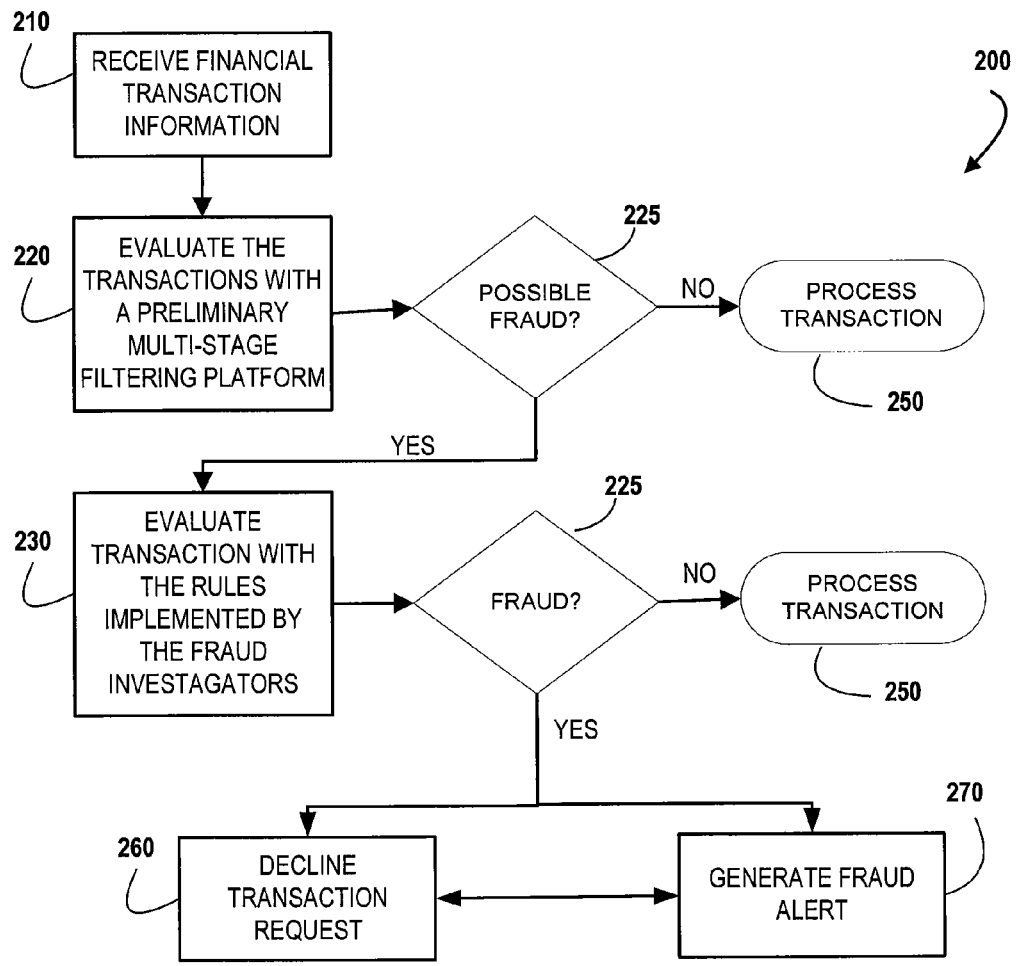
Figure 3:
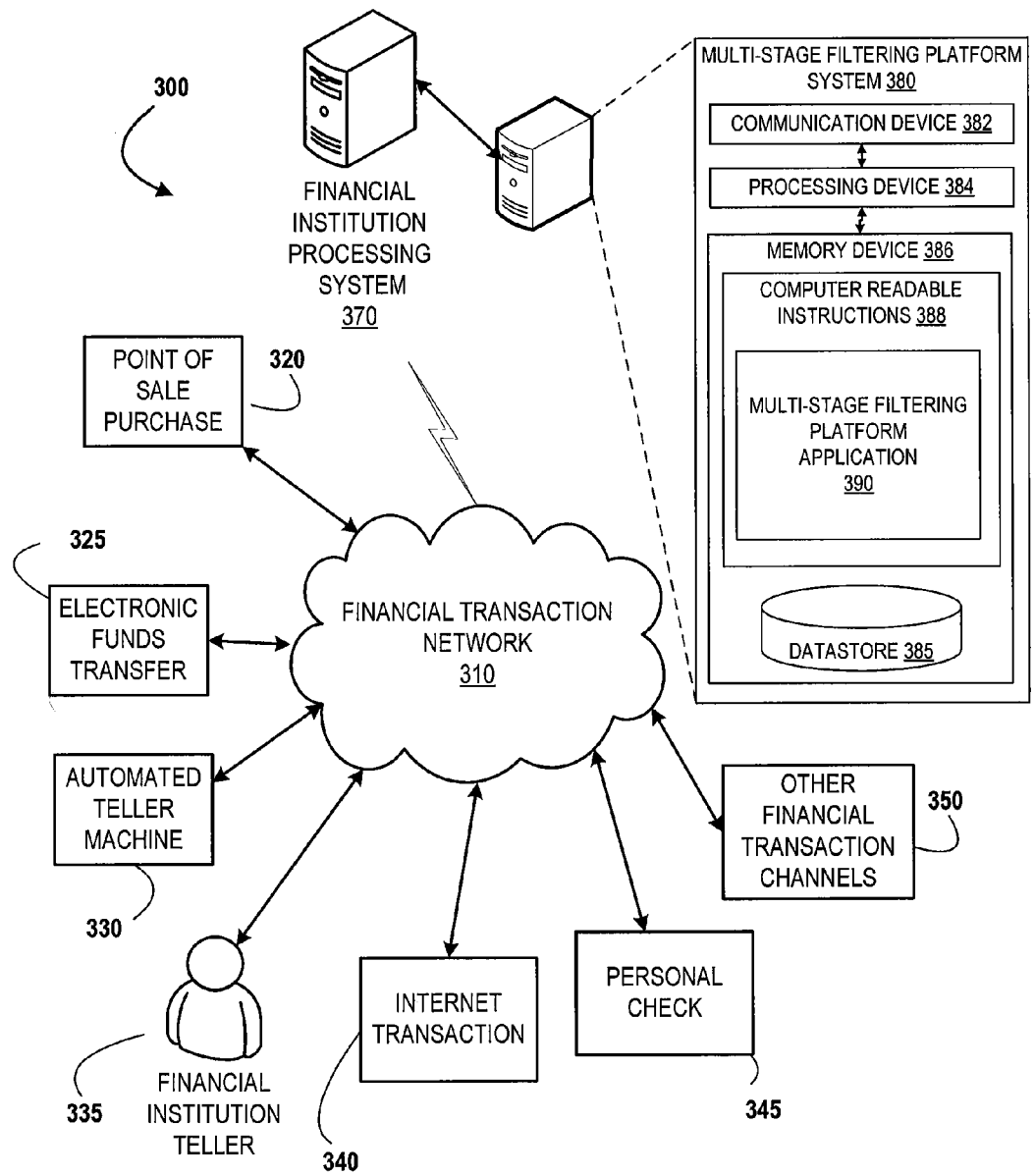
Figure 4:
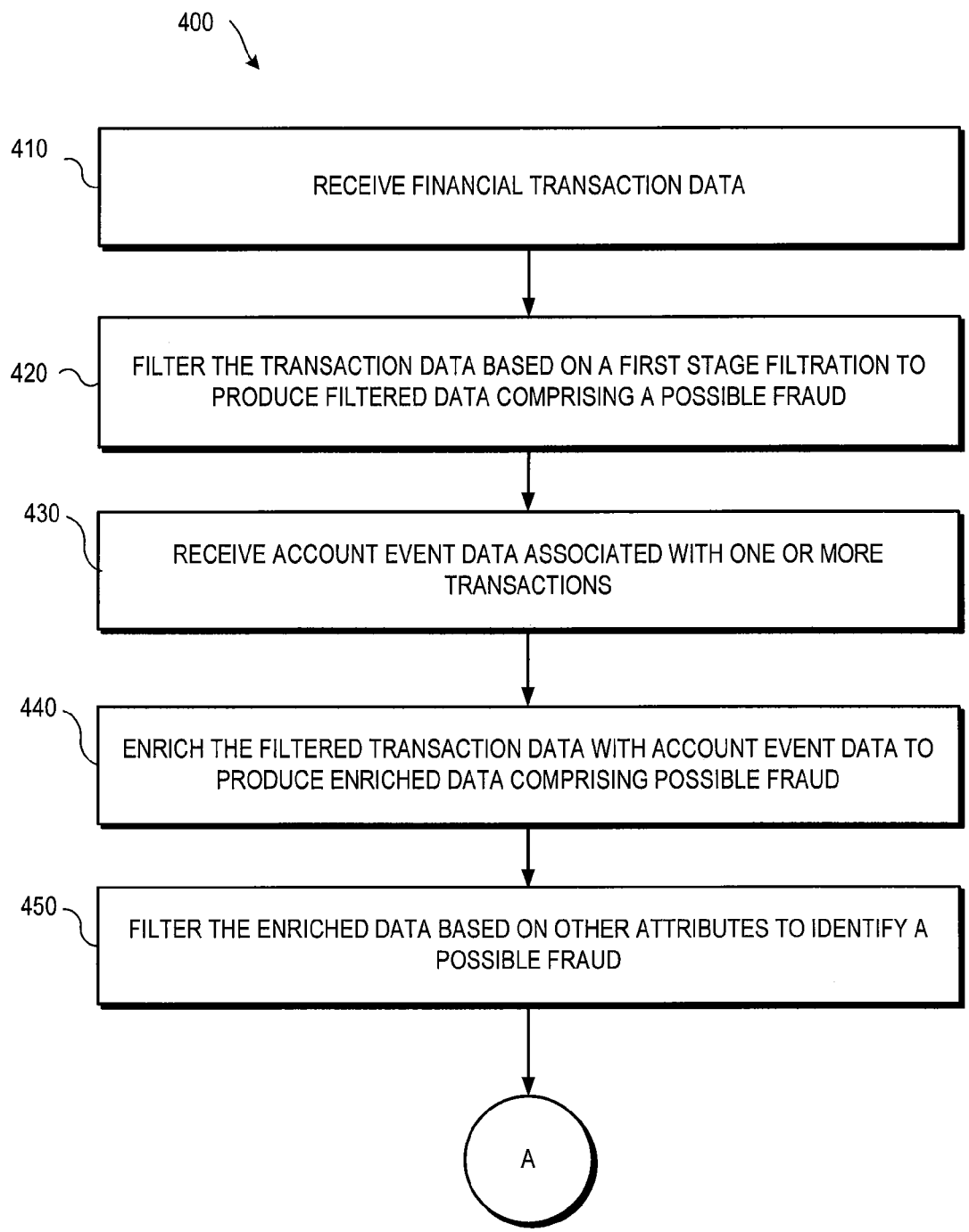
Figure 5A:
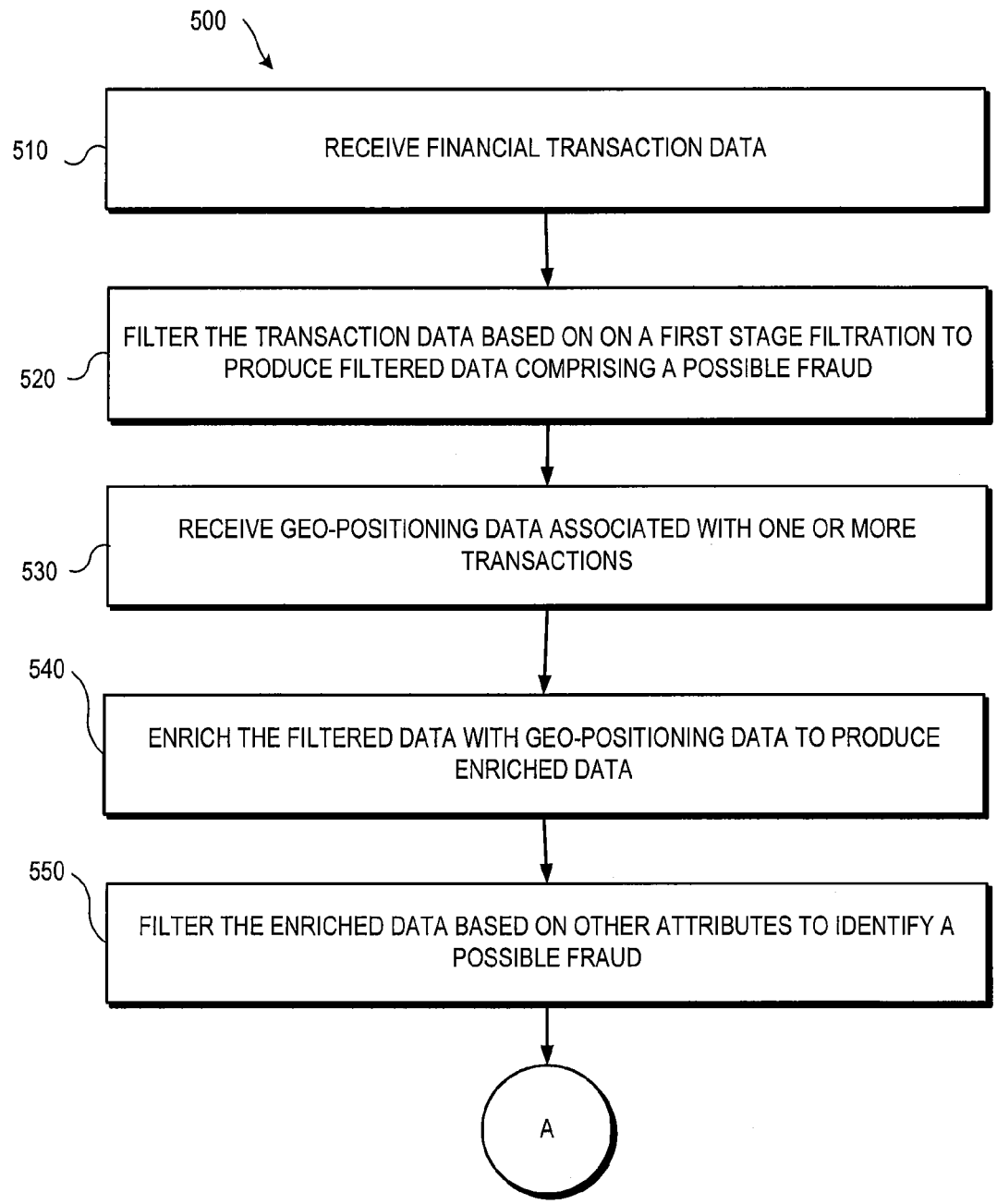
Figure 5B:
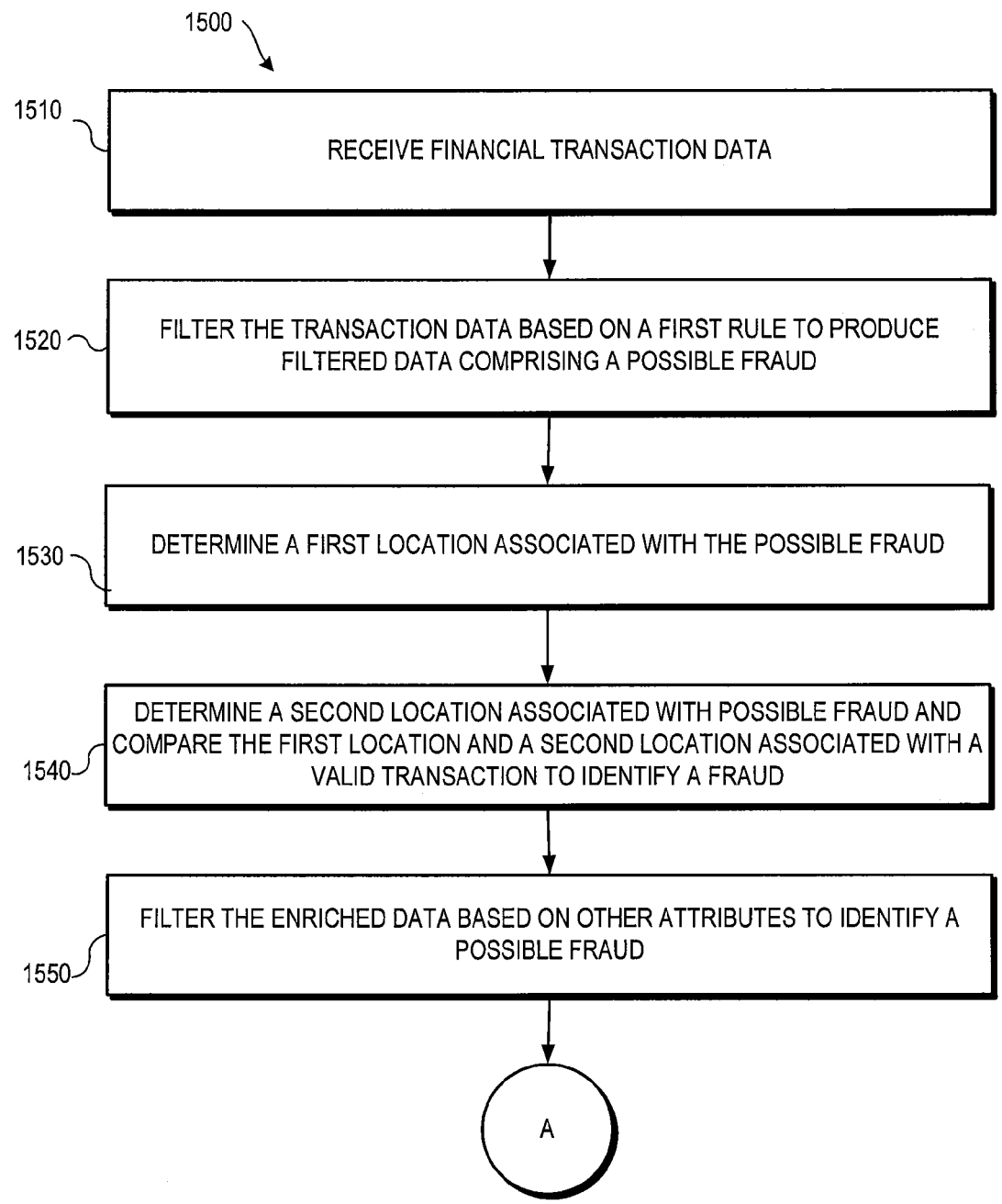
Figure 5C:
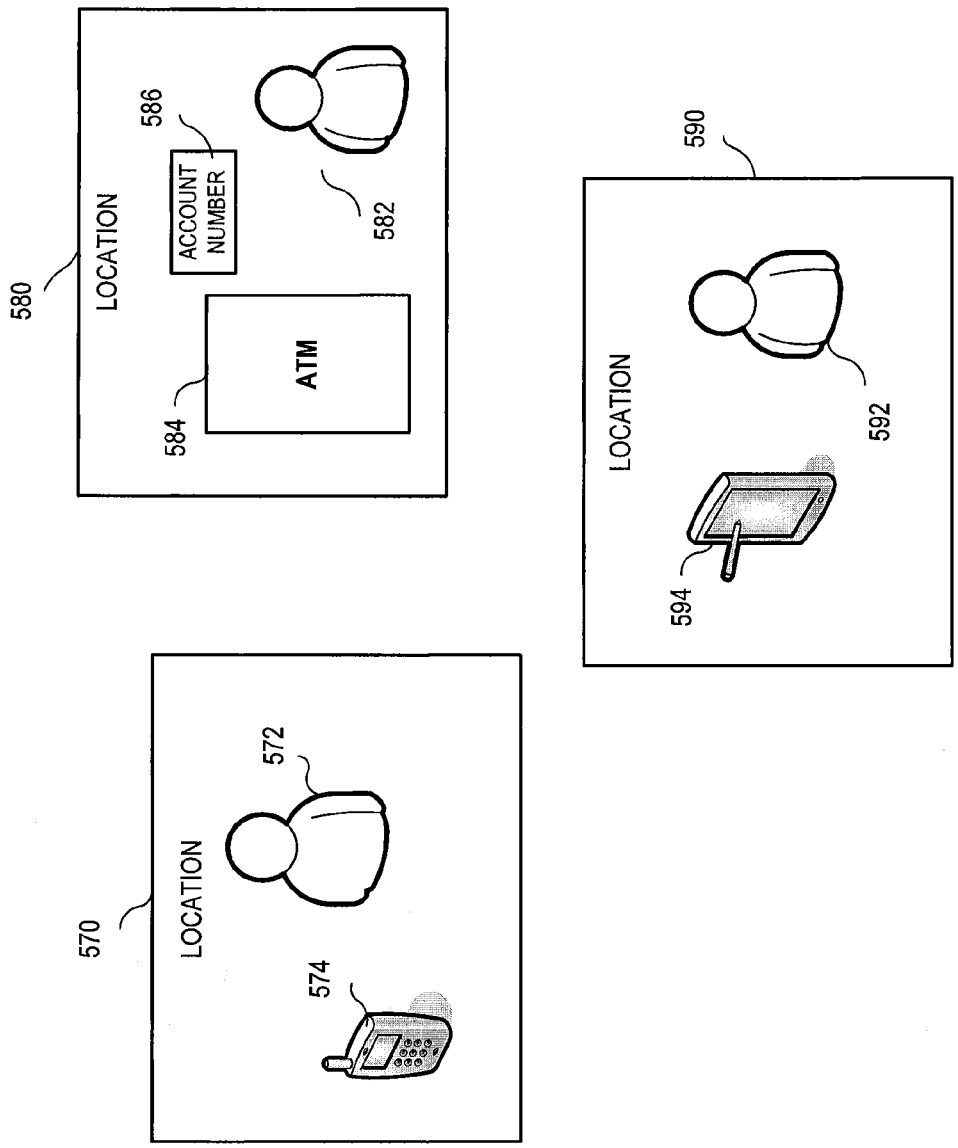
Figure 5D:
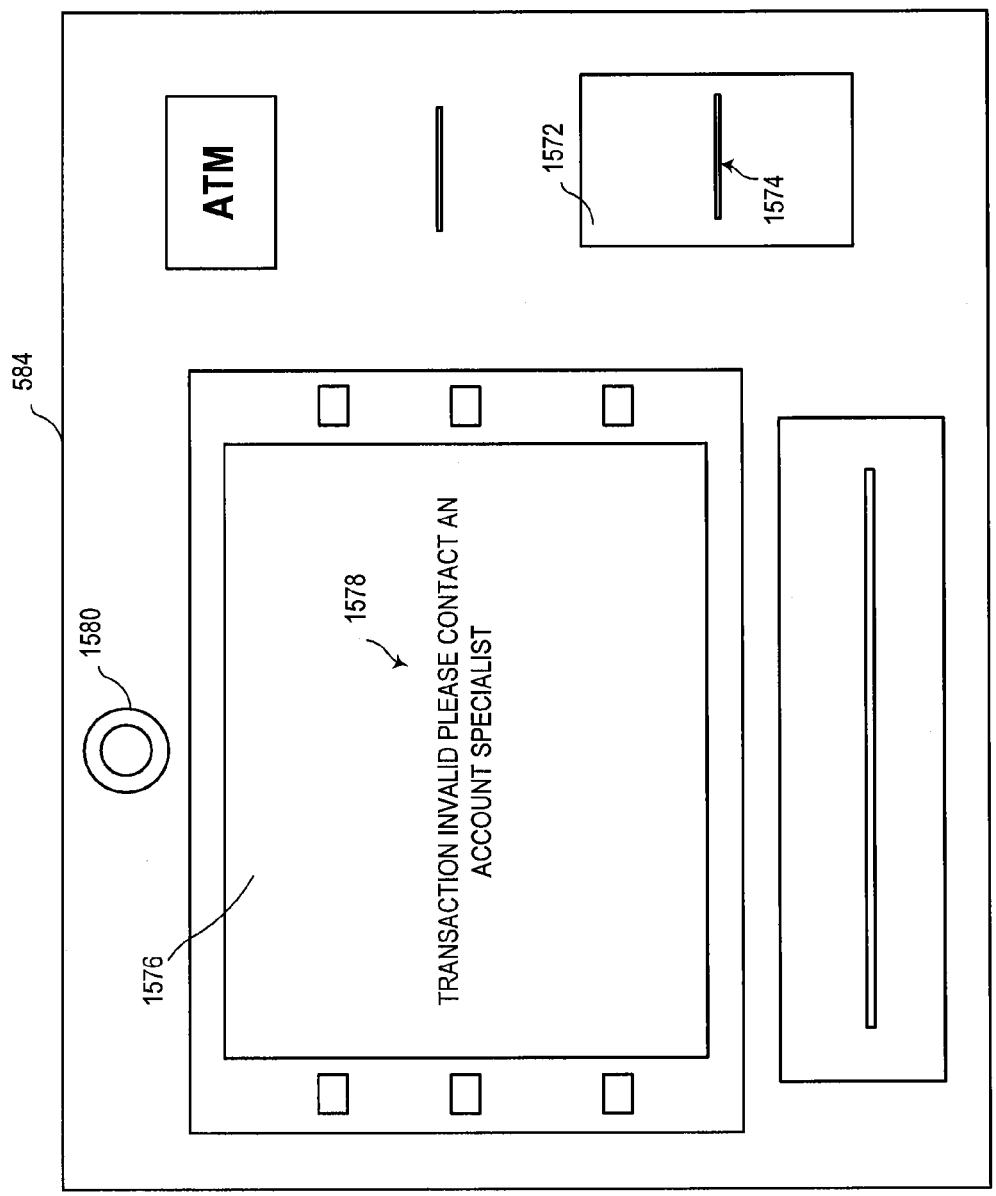
Figure 6:
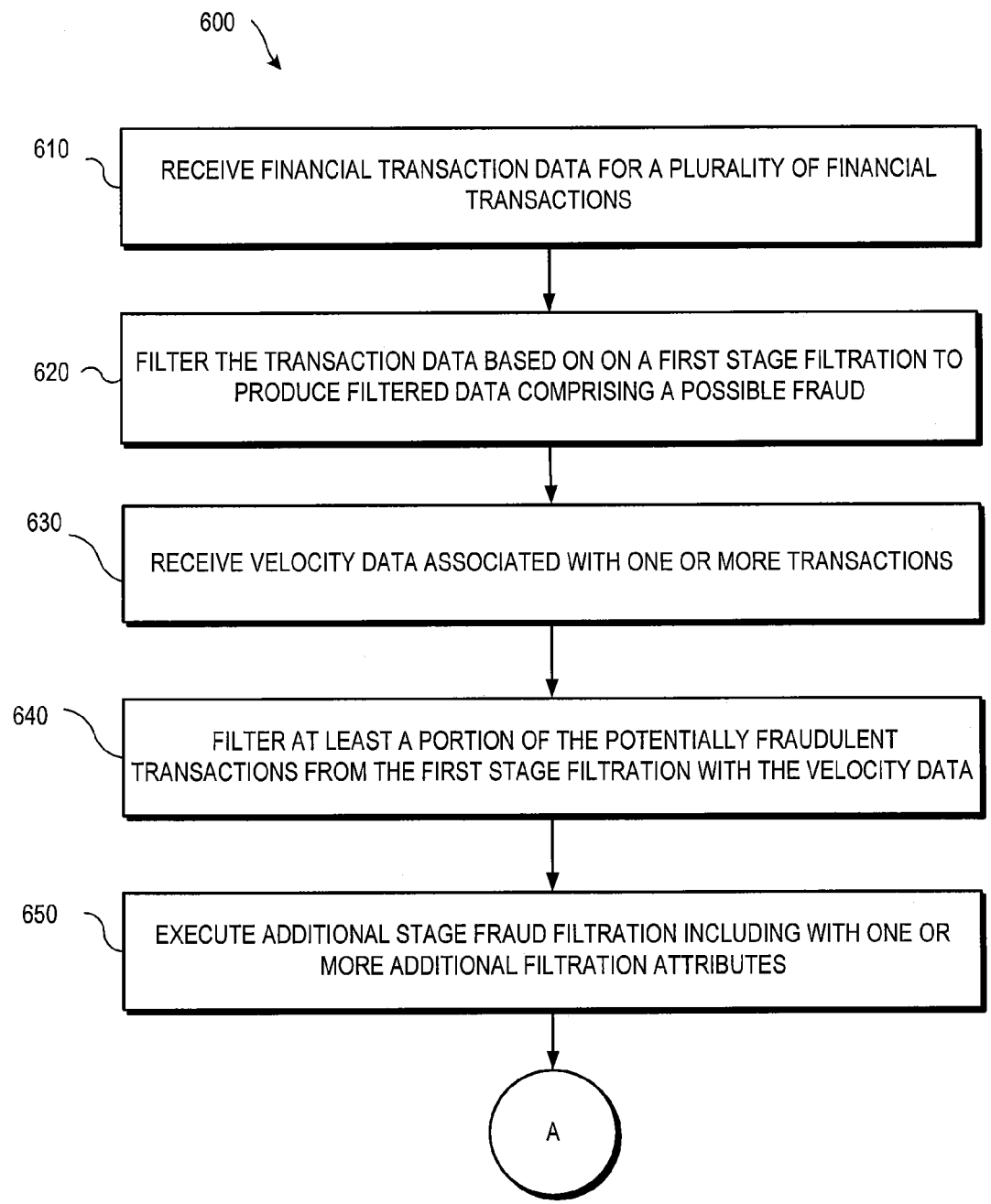
Figure 7:
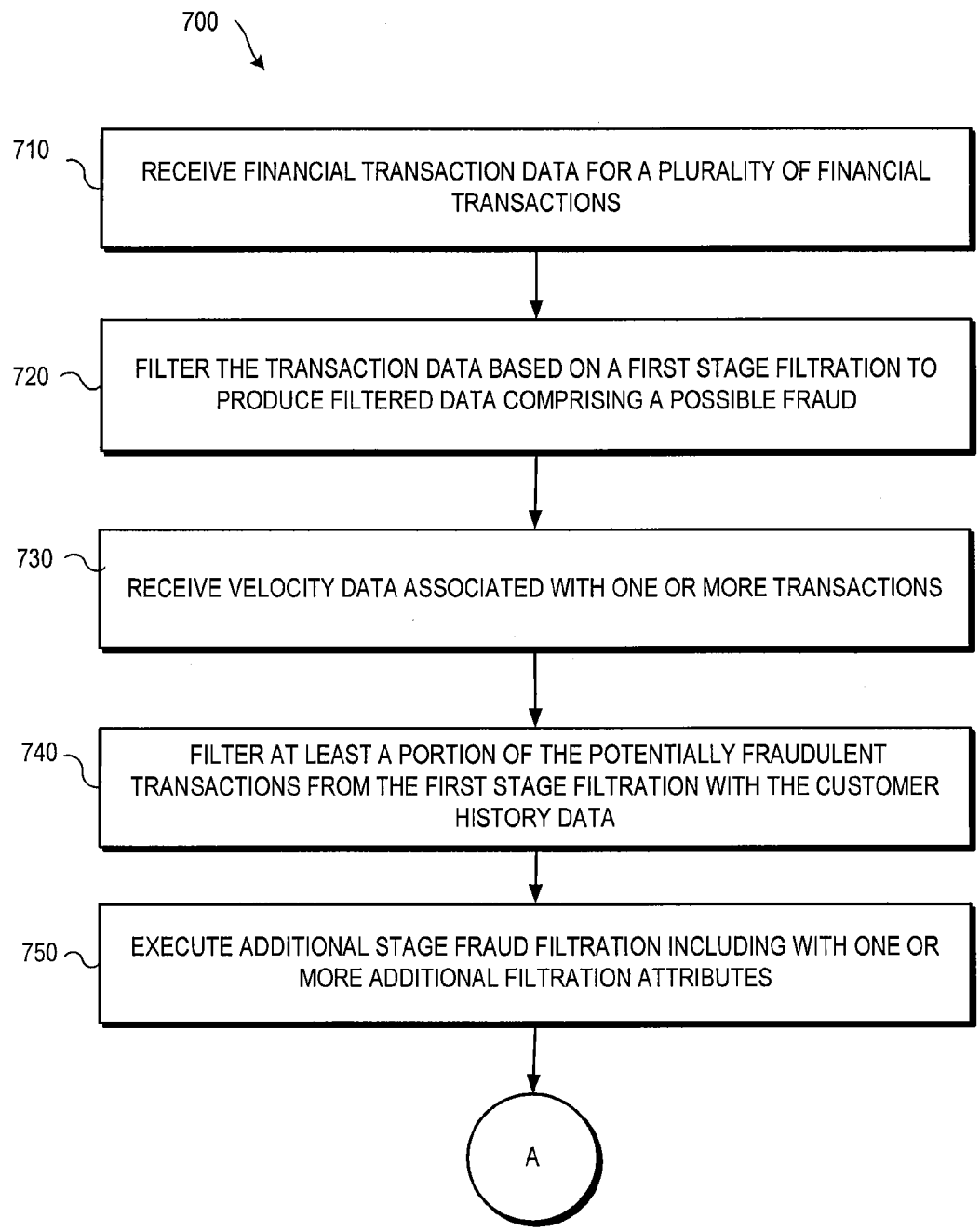
Figure 8:
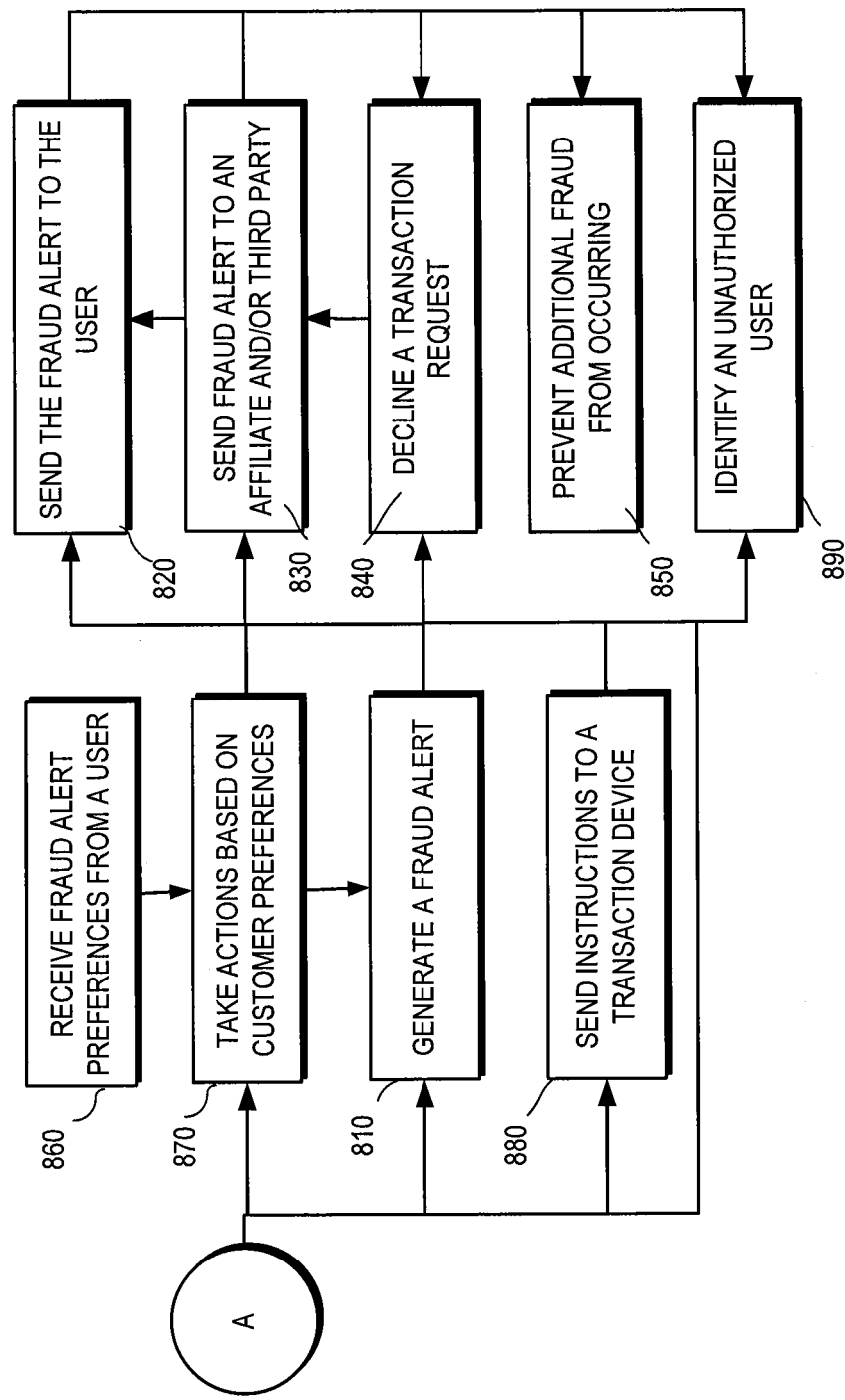
Figure 9:
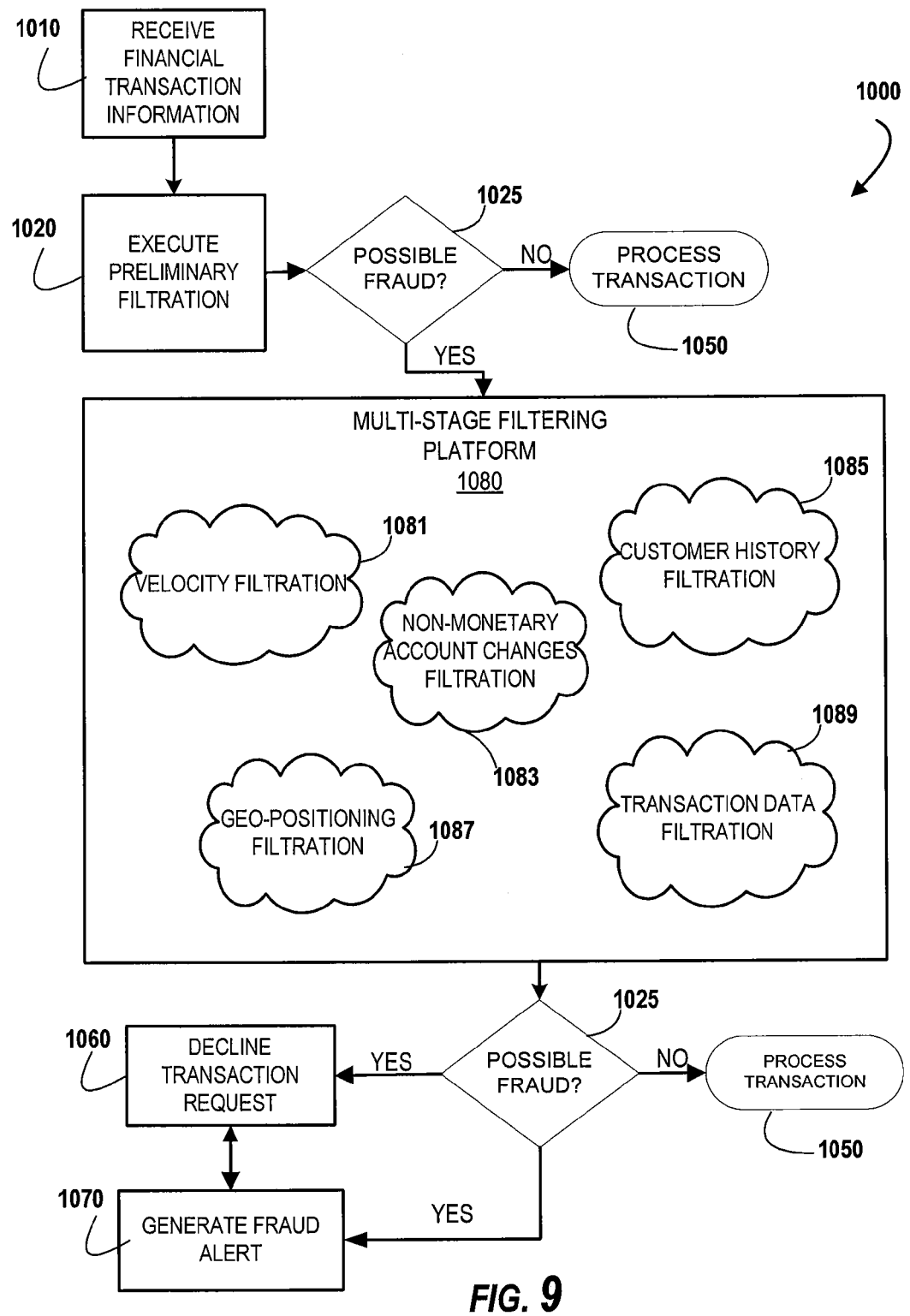

Having thus described embodiments of the invention in general terms, reference will now be made to the accompanying drawings, wherein:

FIG. 1 is a flow diagram of a method for multi-stage filtering for fraud detection, in accordance with embodiments of the invention;

FIG. 2 is a flow diagram of a method for multi-stage filtering for fraud detection, in accordance with embodiments of the invention;

FIG. 3 is a block diagram of a financial transaction environment including a multi-stage filtering platform system, in accordance with embodiments of the invention;

FIG. 4 is a flow diagram of a method for multi-stage filtering utilizing account events to filter potentially fraudulent transactions, in accordance with embodiments of the invention;

FIG. 5A is a flow diagram of a method for multi-stage filtering utilizing geo-positioning to filter potentially fraudulent transactions, in accordance with embodiments of the invention;

FIG. 5B is a flow diagram of the method of FIG. 5A, in accordance with embodiments of the invention;

FIG. 5C is a block diagram illustrating a plurality of locations associated with a method for multi-stage filtering for fraud detection, in accordance with embodiments of the invention;

FIG. 5D illustrates a transaction device, in accordance with embodiments of the invention;

FIG. 6 is a flow diagram of a method for multi-stage filtering utilizing velocity data to filter potentially fraudulent transactions, in accordance with embodiments of the invention;

FIG. 7 is a flow diagram of a method for multi-stage filtering utilizing customer history to filter potentially fraudulent transactions, in accordance with embodiments of the invention;

FIG. 8 is a flow diagram of a method for taking fraud detection-related actions related to one or more potentially fraudulent transactions, in accordance with embodiments of the invention;

FIG. 9 is a flow diagram of a method for multi-stage filtering for fraud detection, in accordance with embodiments of the invention.

Figure 10:
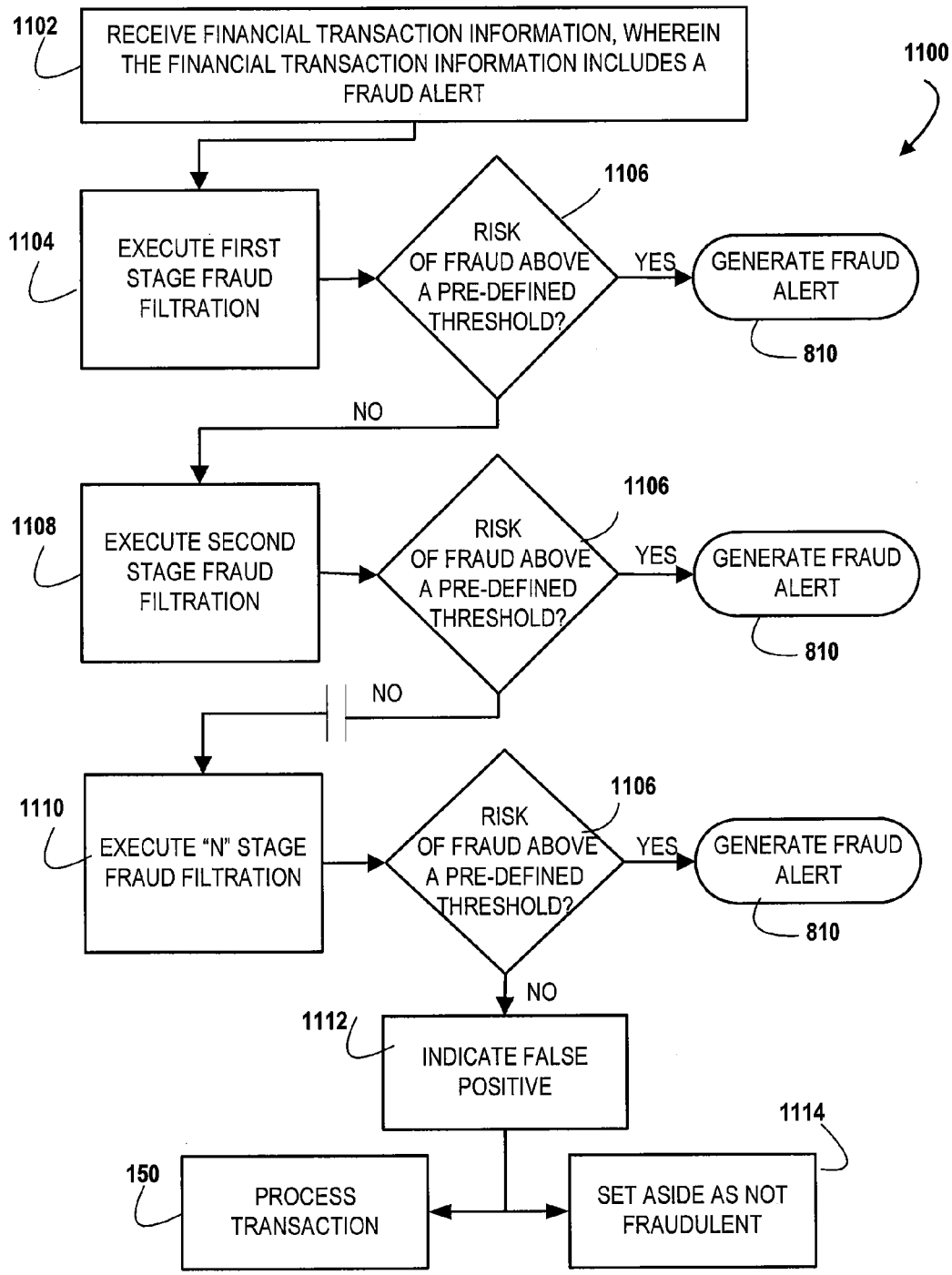
Figure 11:
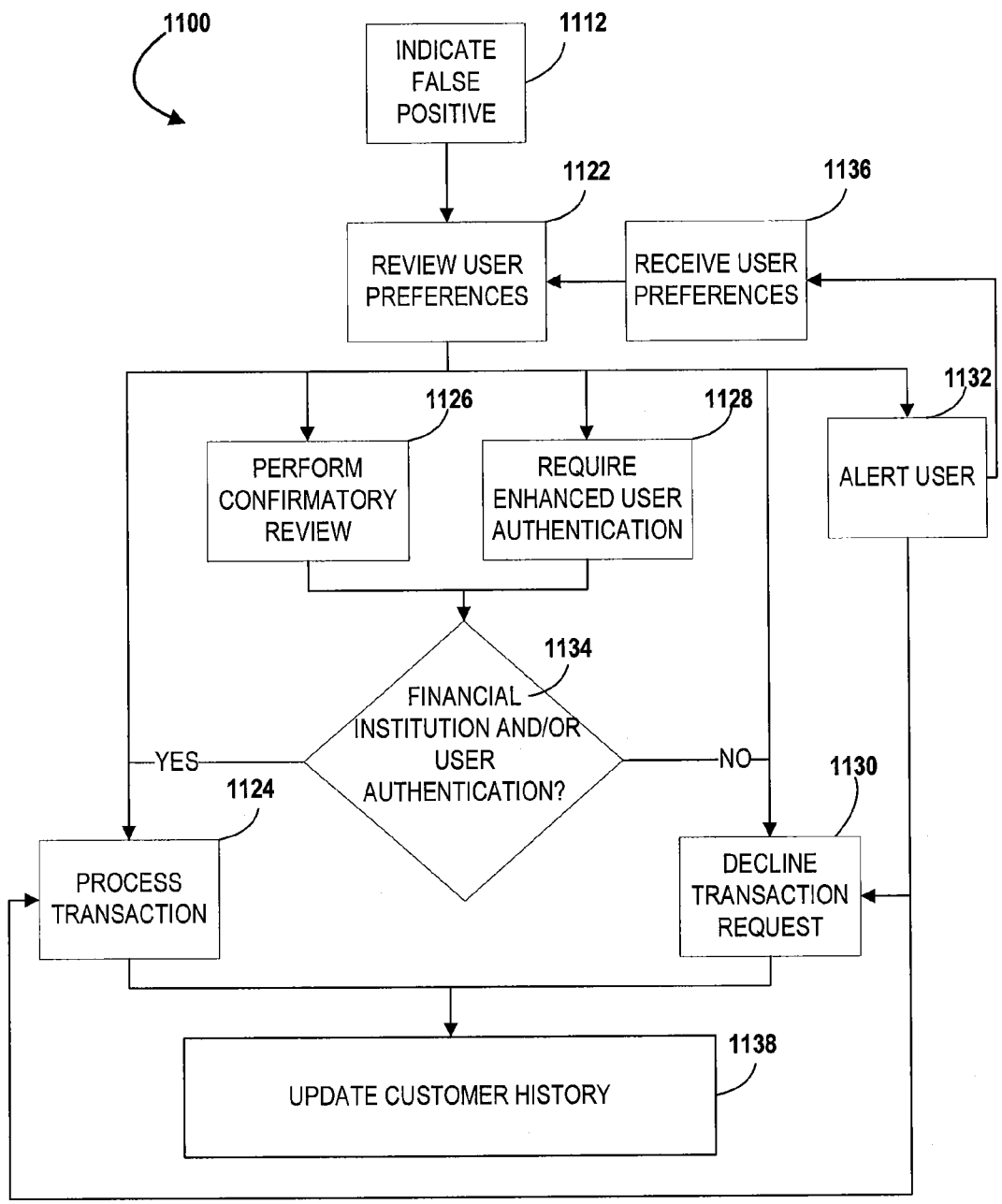
Figure 12:
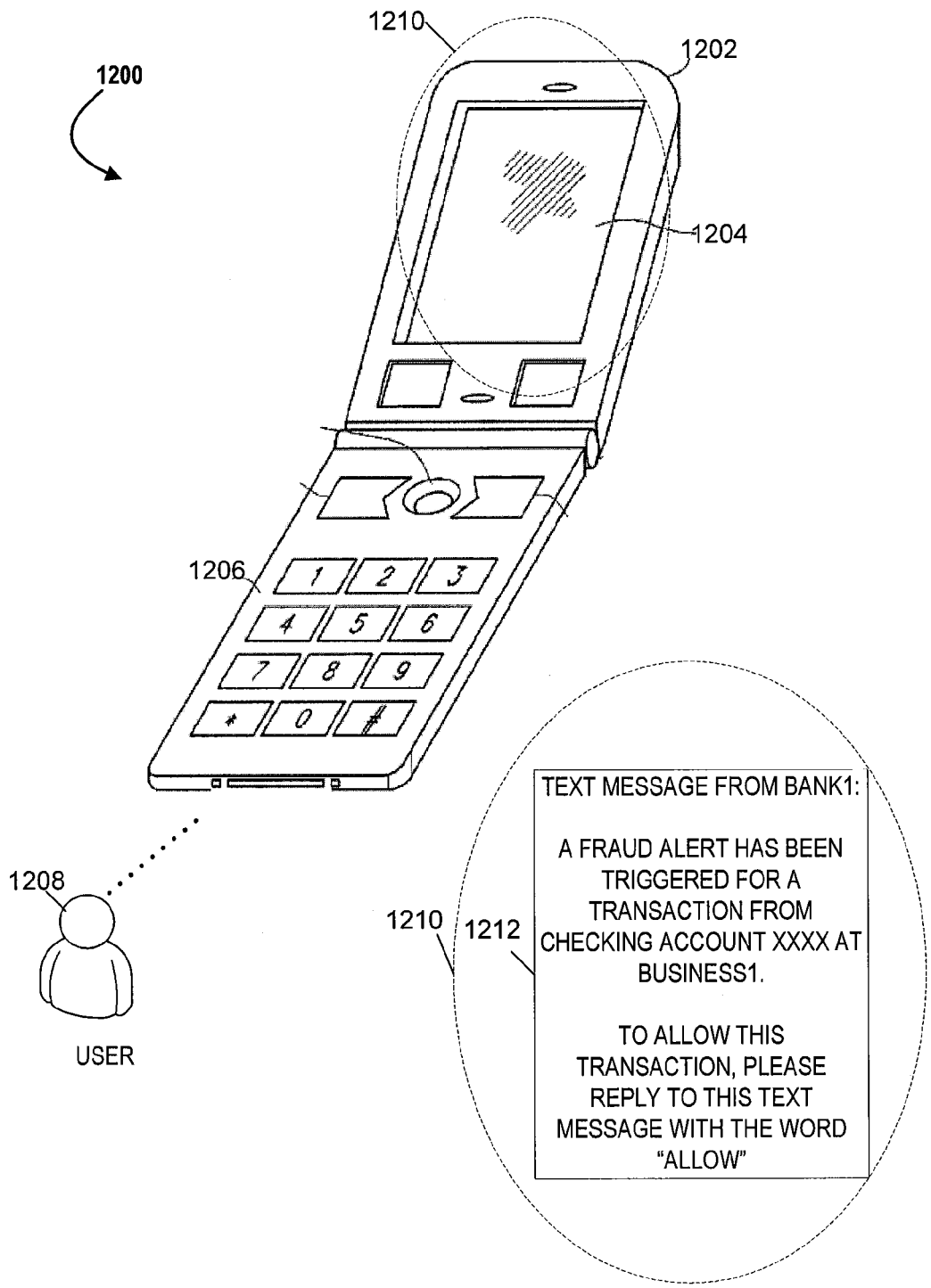
Figure 13:
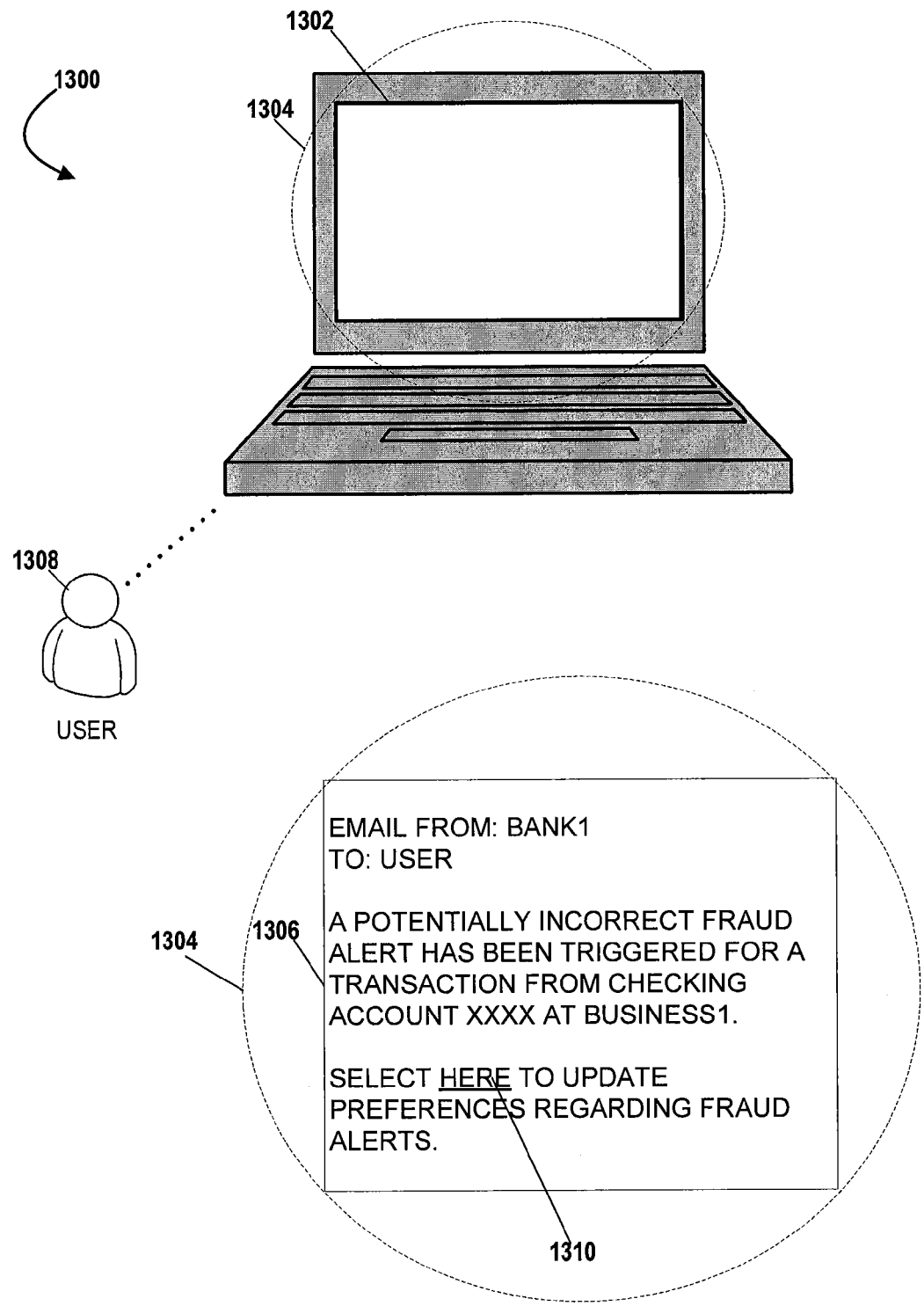
Figure 14:
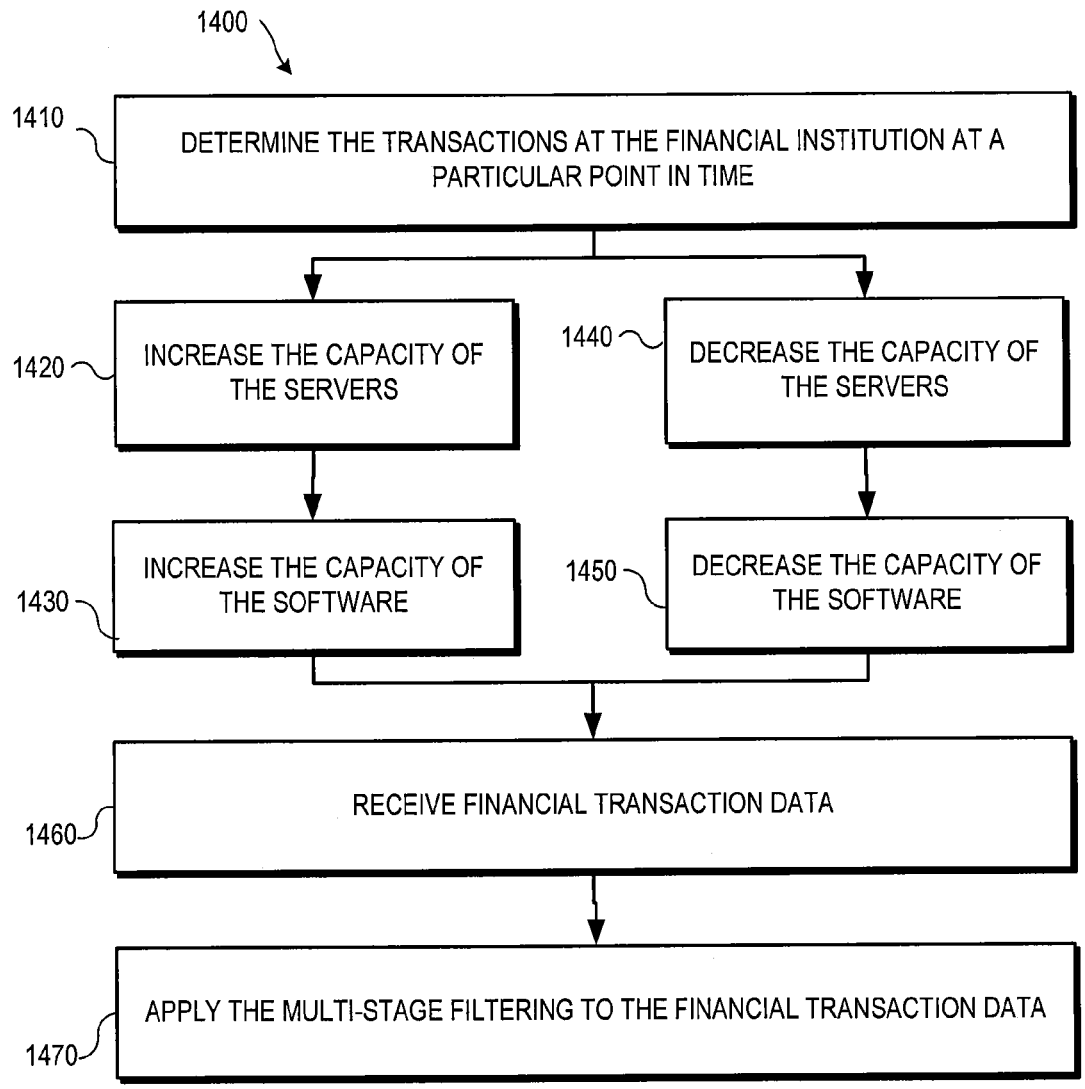

FIG. 10 is a flow diagram of a method for identifying false positive fraud alerts, in accordance with embodiments of the invention;

FIG. 11 is a flow diagram of a method for addressing false positive fraud alerts through fraud detection-related actions, in accordance with embodiments of the invention;

FIG. 12 is an example of an embodiment for requiring enhanced user authentication, in accordance with embodiments of the invention;

FIG. 13 is an example of an embodiment for alerting the user to a false positive, in accordance with embodiments of the inventions; and FIG. 14 is a flow diagram of a method for determining the transaction capacity, in accordance with one embodiment of the invention.

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

In accordance with embodiments of the invention, the term "filtration" or "filter" refers to the means or the process of analyzing aspects of a financial transaction to evaluate the possibility of fraud associated with the transaction. A "filtration stage" is a stage in a multi-stage process wherein the possibility of fraud associated with a transaction is evaluated. After each filtration stage, the transaction is either deemed to be acceptable to process, the transaction is evaluated by a subsequent filtration stage, the transaction is declined, or other fraud related actions are taken to mitigate additional fraud in the future. "Preliminary filtration" refers to the first filtration stage or stages in a multi-stage filtration process. Preliminary filtration is generally a low level filtration designed to quickly filter low level transactions not likely to be fraudulent or not cost effective enough to be subjected to a more in-depth fraud analysis. "Multi-stage" refers to more than one stage. A preliminary filtration stage qualifies as a stage in a multi-stage process, or in some embodiments it may be made up of one or more stages.

In accordance with embodiments of the invention, a "fraud alert" is a notification that the multi-stage fraud detection process has deemed a transaction to be potentially fraudulent. The alert may be a notification of any type to any party including the financial institution customer, an employee of the financial institution, the potential payee of the transaction, etc. The term "fraud-detection action" is an action that may be taken when a transaction is identified as fraudulent and/or potentially fraudulent. The action may include sending a fraud alert, flagging a transaction as fraudulent, preventing a transaction from occurring, accessing additional information to further filter the transaction for potential fraud, etc.

In accordance with embodiments of the invention, "transaction information" may include any information related to a transaction that has occurred for one or more accounts belonging to a customer. For example, transaction information may be the amount of a transaction, the location of a transaction, the merchant at which the customer made a transaction; the product (i.e. good or service) that the customer purchased with the transaction, which account is associated with the transaction, the channel from which the transaction was received, etc.

In accordance with embodiments of the invention "account events" comprise any interactions that an individual, such as a customer or unauthorized user may have with an account of the customer. The account may be a financial account or a customer profile account, which stores customer information, such as addresses, telephone numbers or the like. The interactions with the accounts may be direct or indirect. Indirect interaction may include an online or mobile banking session, in which the individual may not specifically interact with accounts but performs some other financial institution-related activity. As such, account event data may include, but is not limited to, data related to changing account authorization credentials, such as a user identifier and/or password; ordering/re-ordering financial products, such as checks, debit/credit card; linking one account to one or more other accounts; opening and/or closing accounts; addition and/or deletion of account users; changing customer or account-specific personal information, such as mailing address; balance inquiries and the like. In some embodiments the account events may be "non-monetary events" such that monetary events are not related to the account events, however, in some embodiments the account events may include a monetary component.

In accordance with embodiments of the invention, "customer behavior" refers historical patterns in the customer's transactions over a period of time. For example, the "velocity" or "velocity count" is a part of customer behavior and refers to the number of transactions or cumulative amounts of transactions associated with an account or related accounts that occurs within a specified time period; for example, fifteen transactions of $100 within a day, three transactions of $500 or more within an hour. In other embodiments "customer history" is a part of customer behavior, and refers to the types, amounts, locations, or other patterns in the purchasing history of the customer.

In accordance with embodiments of the invention, "customer information" refers to the customer associated with an account, is the customer a preferred customer, how many accounts does the customer have the bank (i.e. checking, savings, credit card, investment, etc.), does the customer pay for additional fraud protection, has the customer set any preferences related to fraud alerts, etc.

In accordance with embodiments of the invention, "geo-positioning" or "geo-caching" refers to the physical location associated with a financial transaction or account event. Geo-positioning may utilize information about the location of each transaction or account events related to one or more customer accounts. Geo-positioning may relate to each of the types of information described above (i.e. transaction information, customer information, customer behavior, and account events).

For example, the geo-positioning of a point of sale (POS) transaction may be the physical location of the POS, the geo-positioning of an internet transaction may be the IP address of the user, etc. Geo-positioning data includes: a physical address; a post office box address; an IP address; a phone number, a locality (e.g., a state, a county, a city, etc.); a country; geographic coordinates; or any other type of data that indicates a geographical location. The geo-positioning data can be associated with a transaction, an account event, a user, a transaction device (e.g., POS, automated teller machine (ATM), physical teller at a bank, etc.), a financial institution, a business, the location of the user's mobile device, and the like. The geo-positioning data may include, for example, a place of domicile of a user, a work location of a user, a secondary home (e.g., a vacation home), etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" may be interchangeable. These terms may relate to a direct customer of the financial institution or person or entity that has authorization to act on behalf of the direct customer or user (i.e. indirect customer).

In general, embodiments of the invention relate to apparatuses, methods and computer program products for a multi-stage filtering platform for fraud detection that utilizes account events, customer behavior, transaction information, customer information, and/or geo-positioning. Financial institution fraud is a growing concern as technology advances and methods of transacting evolve. Already, fraud costs financial institutions billions of dollars each year. With the shear number of transactions, financial institutions are burdened to effectively and efficiently process transactions while screening for fraudulent activity. Many types of fraud monitoring systems have been produced. However, submitting each transaction within a financial institution to a detailed fraud evaluation is both inefficient and leads to a heightened number of false-positive determinations of fraud. The more false-positive determinations the more resources, such as but not limited to employee hours worked, data storage capacity to store information related to the possible fraud, etc. are used to determine whether or not fraudulent occurred, is occurring, is about to occur.

In recognition of the above, generally, the invention provides a multi-stage filtering process and platform for fraud detection. The process includes a preliminary filtration stage or stages that serve to quickly eliminate low risk transactions, such as but not limited to low value transactions, secure channel transactions, preferred customer transactions (i.e. customers that pay for extra fraud protection), etc. Indeed, after each of the one or more filtration stages within the multi-stage filtration process, an evaluation is conducted to determine whether the transaction should be investigated further by a fraud investigator, or in some embodiments, whether or not the transaction should be prevented from occurring. Thus, the process of the present invention serves essentially as a "funnel" that steps through multiple filtration stages eliminating transactions as not likely fraudulent in order to efficiently and effectively focus evaluation and resources on particular transactions or that have a higher likelihood of being fraudulent. The process serves to reduce false-positives as well as consume fewer resources by preventing unnecessary filtering and evaluations of transactions that can be eliminated as potentially fraudulent with lesser levels of scrutiny or can be eliminated as not needed on an opportunity cost analysis basis.

Turning now to FIG. 1, one embodiment of a method for multi-stage filtering for fraud detection 100 is illustrated. At block 110, financial transaction information is received by the processing financial institution. The transaction information may be received from any channel such as point of sale (POS) transactions, automated teller machine (ATM), internet transaction, etc. The transaction information may be data related to transactions that are incoming to the financial institution from other financial institutions or channels, or transactions that are outgoing to other financial institutions or channels.

Once the transaction information is received by the financial institution, the financial institution may then analyze the transaction for possible fraud, for instance, by utilizing a multi-stage filtering process for fraud detection. As illustrated at block 120, after the financial transaction information is received, a first stage fraud filtration may be executed. In the multi-stage filtering process, the transaction may be first filtered at a low-level in order to readily determine whether the transaction includes any attributes that warrant further processing. For instance, in one embodiment, the amount of the transaction may be the only attribute of the transaction that is analyzed and processed in the first stage filtration. Indeed, in one embodiment, if the transaction is less than a pre-determined amount, the transaction may be deemed to not likely be fraudulent and the transaction can be processed. The pre-determined amount may be any amount as determined by the financial institution. In some embodiments, the pre-determined amount is less than approximately $500, in some embodiments less than approximately $200, in some embodiments less than approximately $100, in some embodiments less than approximately $50, and in still further embodiments less than approximately $10. Furthermore, in some embodiments, the pre-determined acceptable range of transaction values may not be entirely inclusive. For example, the pre-determined transaction amount that would be approved may be less than $100, but not inclusive of a specific value (e.g., $37.73) that the financial institution is aware poses a heightened risk for fraud.

One advantage to utilizing a pre-determined amount as a preliminary filter, or a first stage filtration, is that practically, it may not be cost beneficial for the financial institution to submit transactions that are less than a pre-determined amount for further processing. Indeed, further processing of transactions past the first stage filtration necessarily consumes further financial institution resources. Thus, in some embodiments, it is more economically feasible for a financial institution to simply process transactions below a pre-determined amount and accept a higher risk of fraud (including the risk of potentially reimbursing the customer for a fraudulent transaction that is processed) than to submit the transaction to further processing and consume additional financial resources.

Of note, the first stage fraud filtration used to determine potential fraudulent transactions is not necessarily the singular analysis of a single attribute (such as a transaction amount), but may be a low-level analysis of one or more of a plurality of attributes through multiple stages of fraud filtration. Indeed, the first stage fraud filtration may analyze at least one of a plurality of attributes such as, but not limited to, the amount, the payee, the location, the channel, the date and/or time, velocity data, non-monetary account changes data, etc. of a transaction, and thereafter other stages of filtration may or may not be utilized to further filter potential fraudulent transactions using one or more of the attributes described herein. Moreover, when the potentially fraudulent transactions are narrowed down to the most likely fraudulent transactions, whatever attributes that were analyzed in one or more stages of the multi-stage filtration, may also be subject to further analysis in a subsequent analysis of the transaction by a fraud investigator in later stages of the multi-staged filtering analysis, as explained in further detail later. For example, data relating to the identity of the payee may be considered in the first stage filtration and considered and evaluated further in subsequent stages of filtration during the multi-stage filtering and/or by the fraud investigator, if needed. Furthermore, in another example the amount of a transaction may be identified for possible fraud in the first-stage, but may also be identified in as a part of a velocity investigation in the second-stage of filtering (i.e. three transactions in a row of $200). Thus, even though transactions may initially be considered as not fraudulent in the initial stages of the filtering analysis, the same attributes of the filtered transactions may be evaluated again in later stages as part of other attributes being used for additional filtration of fraudulent transactions. Therefore a transaction identified as not fraudulent in one stage of filtration may later be determined to be fraudulent in subsequent stages (or concurrent stages) of filtration when filtered using other attributes.

The preliminary filtration of transactions for fraud prior to submission to a more detailed filtration and/or in-depth analysis and processing by a fraud investigator provides a number of benefits. For example, rapid processing of "low-hanging fruit" transactions that may be readily determined to not likely be fraudulent or otherwise determined to not warrant further scrutiny, may be more cost efficient to the financial institution than submitting all transactions to the same level of fraud investigation. Furthermore, a preliminary filtering stage or multiple stages may eliminate or clear a substantial percentage of the total number of transactions that are further scrutinized by a fraud investigator, and in some embodiments, a majority percentage of the total number of transactions that are investigated for fraud. Thus, preliminary filtration may act to free financial institution resources to be concentrated elsewhere, such as further in-depth processing of higher value potentially fraudulent transactions. As noted above, "preliminary filtration" may be processed completely within the first-stage filtration or, in some embodiments, encompasses more than one stage of filtration.

Thus, once the first-stage fraud filtration is executed, the results are analyzed at decision block 125 to determine whether possible fraud exists in the transaction. If no possible fraud exists (or if it is otherwise determined the transaction should be processed), the transaction is processed as illustrated at block 150. In other embodiments of the invention, if the transactions has already processed before the fraud filtration analysis is completed, instead of processing transaction at block 150, the transaction data my be marked as not fraudulent, potentially not fraudulent, and/or set aside from further fraud analysis. If a possibility of fraud exists, the process proceeds to a second-stage fraud filtration as represented by block 130. The second stage fraud filtration may include a more detailed analysis of the transaction, based on specialized rules set by a fraud investigator, or in other embodiments it may be another low-level filtration stage that is part of the pre-filtering process. The second-stage fraud filtration may include analysis of one or more of any number of attributes associated with the transaction. As with the first stage fraud filtration step above, the process then proceeds to decision block 125 where it is determined whether the transaction should be cleared or submitted for further processing. If the transaction is cleared, the transaction is processed as illustrated at block 150. If the transaction warrants further scrutiny, the process continues to a third stage, fourth stage, fifth stage, etc., until the transaction is either cleared for processing or reaches the final "N" stage in the fraud filtration process. While "N" number of stages is illustrated in FIG. 1, it should be noted that "N" may be any whole number. Indeed, "N" may range from 2 to any whole number practical. However, of note, "N" is at least 2 as the "multi-stage process" necessarily includes at least two stages, e.g., a preliminary filtration stage, subsequent filtration stages, and/or an in-depth filtration stage.

After the "Nth" stage fraud filtration is executed, the process 100 proceeds to decision block 125 where it is ultimately determined if the transaction will be processed, as represented at block 150. With respect to one or more of the decision blocks 125, as previously stated, in some embodiments the transaction being analyzed may have already occurred. Thus, analyzing a transaction that has already occurred is done to identify fraudulent actively for future prevention as opposed to preventing or allowing the transaction being analyzed from being processed in real-time.

In some embodiments, as illustrated by block 160 the transaction is declined when it is determined to be fraudulent, or prevented from being further processed if the transaction has begun to be processed but not yet completed being processed. Therefore, the multistage filtering may allow a financial institution, in some embodiments, to prevent a transaction from occurring before the transaction is ever processed by the financial institution performing the fraud analysis, or by another financial institution involved in processing the transaction. However, as previously discussed, in some embodiments of the invention, the transaction may have already been processed by the financial institution performing the fraud analysis, or another financial institution involved in processing the transaction. In these embodiments, investigating the potential fraudulent transaction that has already been processed my help the financial institution prevent future fraudulent transactions from occurring, catch the person responsible for the fraudulent transaction, etc.

Regardless of if the transaction request is declined or if the transaction has already occurred, generally, a fraud alert is generated, as represented by block 170. The fraud alert may be any type of alert that acts to notify the customer and/or a unit within the bank that a potential fraudulent transaction attempt is occurring or has already occurred. The alert may be an automated telephone communication, an email, SMS/text messaging, a letter or other mailed notification, or any other communication, as explained in further detail later.

In some embodiments, the multi-stage filtering process for fraud detection described herein is employed for every financial transaction for the financial institution. However, it should be noted that the multi-stage fraud filtering process is not necessarily employed for all transactions. Indeed, the financial institution may opt to employ the process for only certain types of transactions (e.g., transactions received from specific channels, transactions received from specific locations, transactions from specific customers, etc.).

Furthermore, in some embodiments, the filtering process may be employed with conventional or otherwise pre-existing fraud detection systems. Thus, the pre-existing filtering processes may be run to filter the transactions, and thereafter, the potentially fraudulent transactions identified in the pre-existing fraud detection systems may be further filtered using the multi-staged filtering process, as described throughout this application. In other embodiments of the invention, the multi-staged filtering process may be used to filter the transactions first before the filtered potentially fraudulent transactions are sent to the pre-existing fraud detection systems for further filtering. In another embodiment of the invention, portions of the multi-stage filtering platform may be employed prior to the evaluation with the conventional pre-existing fraud detection systems, and portions of the multi-stage filtering platform may be employed after the evaluation with the conventional pre-existing fraud detection systems. For instance, in one embodiment, the transaction is preliminarily filtered utilizing one or more filtration stages. Thus in one embodiment, one or more preliminary filtration stages are executed prior to analysis with the conventional or pre-existing fraud detection system. Then, in some embodiments, transactions that are deemed potentially fraudulent by the conventional pre-existing fraud detection system may be subjected to further processing in the multi-stage filtering platform to reduce false-positive occurrences and lessen the burden of fraud investigators to perform a more details fraud analysis.

Utilizing the multi-stage filtration process in conjunction with conventional or pre-existing fraud detection system may be advantageous. For instance, the benefits of the multi-stage filtration process may be fully realized without necessarily completely discarding the already-existing fraud detection system at the financial institution. Furthermore, the multi-stage process necessarily improves upon the already-existing fraud detection system by aiding to further filter possible fraudulent transactions and reducing the number of "false-positive" indications of fraud.

Turning to FIG. 2, a process 200 for filtering transactions for detection of fraud is illustrated. At block 210, the financial institution receives information for a financial transaction. The financial institution then proceeds to process the financial transaction with a multi-staged fraud detection system, as represented by block 220. The multi-stage filtration process 100, as previously discussed and explained in further detail later, is utilized to efficiently and substantially reduce the number of potential fraudulent transactions that require a more detailed analysis by fraud investigators.

After the potential fraudulent transaction is analyzed using the one or more stages of filtering, as illustrated in FIG. 2, the process 200 proceeds to decision block 225. If the transaction is determined to not likely be fraudulent, the transaction is processed, as represented by block 250, and as previously described with respect to block 150. Alternatively, as previously discussed, in the case where the transaction has already occurred the transaction is determined to not be fraudulent and no action is taken, the transaction is marked at not fraudulent or not potentially fraudulent, and/or the transaction is set aside from further filtering. If however, the fraud detection system deems the transaction to be possibly fraudulent, the transaction is then evaluated using the rules defined by the fraud investigators as indicated at block 230.

The fraud investigator filtering process 230 may be the same as or similar to the pre-filtering stage or stages. However, instead of pre-filtering the fraud investigator may set up specialized rules to examine the potentially fraudulent transaction on a customer level instead of a transaction level. For example, the fraud investigator may set up rules to look at all of the events related to the customer, such as transaction information (i.e. amount, the payee, the location, the channel, the date and/or time, etc.), customer behavior information (i.e. customer history, velocity data, etc.), account events (i.e. non-monetary account data, etc.), customer information (i.e. customer profile information, customer fraud preferences, type of customer, preferred customer, etc.). In this way the fraud investigator may determine if potential fraud exists, the likelihood that fraud exists, etc. based on the experience of the fraud investigator and an omniscient view of the customer as a whole as opposed to a narrow view of just the transaction.

Once the fraud investigator filtering process 230 analyzes the transaction in view of the overall customer, the process 200 moves to decision block 225. If the transaction is deemed to not likely be fraudulent, the transaction related to the customer is processed, as illustrated at block 250. Alternatively, if the transaction has already occurred, and if the transaction is deemed to not likely be fraudulent then the transaction is dismissed for further inquiry, marked as not fraudulent or not potentially fraudulent, etc. However, if the transaction is determined to be fraudulent, the transaction may be declined, as represented at block 260 and a fraud alert may be generated as noted at block 270. Alternatively, if the transaction has already occurred, and if the transaction is deemed to be fraudulent, then an alert may be generated for the customer and or the customer accounts in order to prevent future fraudulent actively associated with the customer. As described with respect to FIG. 1, the alert may be used to prevent the transaction from processing or the alert may be used to prevent fraudulent transactions from occurring in the future.

Again, the preliminary filtration stage(s) may act to quickly process transactions with a low level of fraud likelihood. This preliminary processing may alleviate a substantial transaction processing burden on the fraud investigators by preventing unnecessary analysis of low-level and/or low-value transactions.

Referring to FIG. 3, a block diagram illustrates a financial transaction environment 300 configured for transacting across a financial transaction network 310 according to embodiments of the invention. The network 310 may include a local area network (LAN), a wide area network (WAN), and/or a global area network (GAN). The financial transaction network 310 may provide for wireline, wireless, or a combination of wireline and wireless communication between communication devices in the financial transaction network 310. The financial transaction network 310, in some embodiments, includes the Internet.

As illustrated, the financial transaction environment 300 includes a plurality of channels for initiating a financial transaction such as a POS purchase 320, electronic funds transfer (EFT) 325, an ATM 330, a financial institution teller 335, an internet transaction 340, personal checks 345, and other financial transaction channels 350.

In addition, as illustrated, a financial institution processing system 370 is generally present within the financial transaction environment 300. A multi-stage filtering platform system 380 may additionally be in communication with the processing system 370. While a single processing system 370 and multi-stage filtering platform system 380 is illustrated, it will be appreciated that any number of processing systems 370, platform systems 380, servers (not shown), workstations (not shown), etc. may be present within the financial transaction environment. The multi-stage filtering platform system 380 may, in various embodiments be configured for performing one or more of the steps and/or sub-steps discussed with reference to FIGS. 1 and 2 above or FIG. 3 through 14 below and/or one or more additional steps and/or sub-steps described herein. In the configuration shown, the financial institution processing system 370 communicates across the financial transaction network 310 with one or more devices through the various financial transaction channels.

The multi-stage filtering platform system 380, in various embodiments, includes a communication device 382 controlled by a processing device 384 in order to communicate with external devices such as the financial institution processing system 370. While the processing system 370 and platform system 380 are illustrated as separate structures, it will be appreciated that the multi-stage filtering platform system 380 may be incorporated within one or more processing systems 370, servers, etc. Furthermore, the multi-stage filtering platform system 380 may communicate directly with devices across the financial transaction network 310. As noted above, the financial transaction network 310 may be an intranet network, such as but not limited to the Internet, a local area network, a wide area network, and/or any other electronic device network, and/or any combination of the same. The processing device 384 is also in communication with a memory device 386 configured for storing computer-readable and computer-executable instructions 388. The computer-readable instructions, in various embodiments, include one or more applications, such as a multi-stage filtering platform application 390.

The communication device 382 may generally include a modem, server, transceiver, and/or other device for communicating with other devices on a network. The processing device 384 may generally refer to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system may be allocated between these processing devices according to their respective capabilities. The processing device 384 may further include functionality to operate one or more software programs based on computer-executable program code thereof, which may be stored in a memory. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 384 may be configured to use the communication device to transmit and/or receive data and/or commands to and/or from the other devices connected to the financial transaction network 310 or other network.

The memory device 386 may generally refer to a device or combination of devices that store one or more forms of computer-readable media for storing data and/or computer-executable program code/instructions. For example, the memory device may include any computer memory that provides an actual or virtual space to temporarily or permanently store data and/or commands provided to the processing device when it carries out its functions described herein.

With respect to FIG. 3 in some embodiments of the invention, the transaction data from the various channels 320, 325, 330, 335, 340, 345, 350 may first be initially evaluated by a secondary financial institution processing system. The secondary system in some embodiments of the invention may receive the transaction data and/or analyze the data for potential fraudulent transactions before sending the transaction data to the financial institution processing system 370. The secondary system communicates with the financial institution processing system 370 over the financial transaction network 310 and transfers the valid and potentially fraudulent transactions data to the financial institution processing system 370.

Generally, in some embodiments, some, all or none of the method steps and/or sub-steps discussed above with reference to FIGS. 1 and 2 and below with reference to FIGS. 4 though 14 are embodied in computer-executable instructions within the multi-stage filtering platform application 390. In some embodiments, one or more applications are contained within a single multi-stage filtering platform application 390, and in other embodiments, the instructions for executing the method steps disclosed herein are spread over two or more applications. In some embodiments, some of the instructions for executing the methods disclosed herein are stored on the multi-stage filtering platform system 380 and some of the instructions are stored on an external device. In some embodiments, some or all the instructions are stored remotely from the multi-stage filtering platform system 380 and accessed as necessary by the multi-stage filtering platform system 380 and/or any other device requiring instructions. Further, in some embodiments, the memory device 386 includes a datastore 385 or database configured for storing information and/or data. In other embodiments, the datastore 385 is housed remotely from the multi-stage filtering platform system 380 and the multi-stage filtering platform system 380 is in communication with the datastore 385 across the financial transaction network 310 and/or across some other communication link.

In some embodiments one or more additional systems or servers are configured for communicating with the multi-stage filtering platform system 380. In some embodiments, a multi-stage filtering platform system 380 functions as a central control server and accesses the various pieces of information from various locations. In various other embodiments, multiple servers or systems function together as a central control server and access different pieces of data and/or instructions in order to perform one or more of the method steps discussed herein.

In one embodiment of the invention, the transactions are filtered in one of the stages of the multi-staged filtering through the use of account event data. As previously discussed account event data includes any interaction that an individual, such as a customer or unauthorized user may have with an account. The account may be a financial account or a customer profile account, which stores customer information, such as addresses, telephone numbers or the like. The interactions with the accounts may be direct or indirect. Indirect interaction may include an online or mobile banking session, in which the individual may not specifically interact with accounts but performs some other financial institution-related activity. Direct interactions may include, but are not limited to, data related to changing account authorization credentials, such a user identifier and/or password; ordering/re-ordering financial products, such as checks, debit/credit card account changes; linking one account to one or more other accounts; opening and/or closing accounts; addition and/or deletion of account users; changing customer or account-specific personal information, such as mailing address; balance inquiries and the like.

Account event data may also include data related to a customer's session, such as, online banking session, user's mobile banking session, user's automated teller machine session, or user's call center session. Included within this data may be location-determining data (i.e. geo-positioning data), such as physical location of the ATM, telephone, computing device, and the like, through the use of an IP address, global positioning satellite (GPS), radio frequency (RF) identifier, and the like.

Furthermore, account event data may include account data that identifies related financial accounts that are associated with each of the one or more accounts identified in the customer event. Identifying related financial accounts, including the quantity of related accounts, provides for patterns to be identified in assessing whether cumulative transactions related by account association warrant fraud detection-related actions. Additionally, the account event data may include customer data for the customer associated with the financial accounts, the data may include names, passwords, physical and electronic addresses, telephone numbers and the like.

In this way the account events in some embodiments may be described as non-monetary changes in that the account events do not relate to monetary transactions. In some embodiments the account events may relate to changing the maximum balance of a credit card account, or other account, which is related to a monetary value of an account, however, this type of event may still be considered to be a non-monetary event because an actual amount did not exchange hands.

The fraud detection-related actions that result from identifying a potential fraudulent transaction may include, but are not limited to, further filtering, automatically generating and communicating an alert, automated fraud scoring and/or decisioning, intervention by a fraud analyst, preventing a transaction from occurring in past or future, alerting a person or group at the financial institution to prevent future transaction, placing a alert or hold on an account to prevent future transaction, or the like. Commonly, generating an alert may serve to notify affected parties and/or provide automated prevention measures to circumvent the current fraud or future fraud from occurring.

Fraud detection-related actions occurring from the filtration, includes in other embodiments of the invention, a determination of what actions can be taken to prevent fraud from occurring. For example, if a pattern of events have been identified through filtration as being potentially fraudulent, transactions that have yet to occur in the future which are likely fraudulent can be prevented by taking preventative measures to prohibit the fraud from occurring, such as disabling accounts associated with the fraudulent transaction.

Referring to FIG. 4, a flow diagram is presented for a fraud analysis utilizing account events method 400, in accordance with embodiments of the present invention. At block 410, financial transactions data is received that is associated with a customer and/or a customer account. Each transaction is related to one or more customer financial accounts. The data that is received about the transaction may include, but is not limited to, type of account, account holder name, date and time of transaction or account change, amount of the transaction, transacting parties and the like. The financial transaction may be associated with one of a plurality of financial transaction channels, financial transaction products, financial transaction applications, and/or financial accounts. In one specific embodiment the financial transaction data reflects data related to all transactions regardless of financial transaction channel, financial transaction product or financial transaction application.

At block 420, the transaction data is filtered based on a first stage-filtration to produce filtered data comprising possible fraudulent transactions. In some embodiments, a first rule is associated with the first stage fraud filtration as described throughout. For example, in some embodiments, one or more transactions are defined as being not fraudulent and are removed from the financial transaction data such that the filtered data comprises the remaining potentially fraudulent transactions. The first filtering stages include a calculation, an algorithm, or any type of formula for eliminating subsets of data from a data pool based on specified criteria. In some embodiments, for example, the first rule includes a transaction or monetary amount, a type of account (e.g., a checking account, a savings account, a basic checking account, a premier checking account, etc.), a type of user (e.g., an individual, joint account holders, a business, etc.), a financial transaction channel, a type of transaction, previous transactional behavior of a user, and the like. In one embodiment, the first rule includes a predetermined transaction amount. In some embodiments, the first rule includes a time period. For example, in some embodiments, the first rule includes time stamps associated with one or more transactions. The filtered data may include, for example, only transactions that occur on a certain day or week. It will be understood that the first rule includes one or more rules and/or filter attribute criteria. The first rule may include, for example, a dollar amount and a type of account. It will be further understood that the transaction data may be filtered any number of times and in any order as described above with respect to FIGS. 1 and 2. For example, the transaction data can be filtered based on the financial transaction channel and then subsequently filtered based on a transaction amount and type of user or vice versa.

At block 430, account event data associated with one or more events pertaining to one or more financial accounts is received. For the transactions that were identified as potentially fraudulent in the first stage filtering described in block 420, associated account event data may be retrieved manually or automatically.

As illustrated by block 440 the account event data may be used to further enrich and filter the transactions identified as potentially fraudulent in block 420, in order to further filter fraudulent transactions between non-fraudulent transactions and potentially fraudulent transactions. In some embodiments of the invention account event data may be utilized as a pre-filtering technique for identifying potentially fraudulent transactions. However, in other embodiments of the invention the account event data may be utilized by a fraud investigator as a more detailed filter used in conjunction with the fraud investigator's specially defined rules for filtering the fraudulent transactions from the non-fraudulent transactions.

As illustrated by event 450, in addition to receiving financial transaction data, pre-filtering the transaction data using one or more attributes to identify potentially fraudulent transaction, and thereafter filtering the potentially fraudulent transactions using account event data, the method may further comprise additionally or alternatively filtering the transactions using other data used as filtering attributes. The other data may include, but is not limited to the attributes previously discussed, such as but not limited to geo-positioning data, transaction velocity data, account data that identifies accounts associated by customer name with the accounts in the financial transactions, and customer information such as profile data, customer history data, etc.

The financial transactions are filtered based on the financial transaction data and/or other filtering attributes in conjunction with the account event data to determine which of the financial transactions warrant further fraud detection-related actions, such as notification alerts, fraud-prevention actions, etc. The fraud detection-related actions, as described in more detail with respect to FIG. 8, are implemented with respect to final list of identified potentially fraudulent transactions. The fraud detection-actions may include, but are not limited to, further filtering, automatically generating and communicating a fraud alert, fraud scoring and/or decisioning, analysis by a fraud analyst or the like. In addition, the method may further include filtering events based on the financial transaction data and the account event data to determine which events warrant further fraud detection-related actions.

In one embodiment of the invention, as previously discussed geo-positioning may be included in the fraud analysis in order to determine potentially fraudulent activity. FIG. 5A illustrates a flow chart for a fraud analysis method utilizing geo-positing 500 in accordance with one embodiment of the invention. It will be understood that one or more devices, such as one or more mobile device and/or one or more other computing devices and/or servers, can be configured to perform one or more steps of the method 500. In some embodiments, the one or more devices performing the steps are associated with a financial institution. In other embodiments, the one or more devices performing the steps are associated with a business, third party, and/or user.

In block 510, financial transaction data related to outgoing or incoming transactions at the financial institution is received. In some embodiments, the transaction data is received from a customer (i.e. an individual or a business), and/or any other individual or organization associated with the transaction.

In block 520, the transaction data is filtered based on a first stage filtration to produce filtered data comprising potentially fraudulent transactions. In some embodiments, the first stage filtration is based on a first rule as described herein. For example, in some embodiments, one or more transactions are removed from using the received financial transaction data such that the filtered data comprises the remaining transactions, with the associated transaction data, that may be potentially fraudulent. The one or more transactions deemed not potentially fraudulent are either allowed to be processed, set aside as not fraudulent, or set aside for use in further filtering analysis in the future.

The first rule in the first stage filtration may include a calculation, an algorithm, or any type of formula for eliminating subsets of data from a data pool based on specified criteria. In some embodiments, for example, the first rule includes a transaction or monetary amount, a type of account (e.g., a checking account, a savings account, a basic checking account, a premier checking account, etc.), a type of user (e.g., an individual, joint account holders, a business, etc.), a financial transaction channel, a type of transaction, previous transactional behavior of a user, and the like. In one embodiment, the first rule includes a predetermined transaction amount. In some embodiments, the first rule includes a time period. For example, in some embodiments, the first rule includes time stamps associated with one or more transactions. The filtered data may include, for example, only transactions that occur on a certain day or week. It will be understood that the first rule includes one or more rules and/or filter criteria. The first rule may include, for example, a dollar amount and a type of account. It will be further understood that the transaction data may be filtered any number of times and in any order as described above with respect to FIGS. 1 and 2. For example, the transaction data can be filtered based on the financial transaction channel and then subsequently filtered based on a transaction amount and/or type of user, or vice versa.

At block 530, geo-positioning data associated with one or more transactions and/or account events pertaining to one or more financial accounts is received. For the transactions that were identified as potentially fraudulent in the first stage filtering described in block 520 associated geo-positioning data may be retrieved manually or automatically.

As illustrated by block 540 the geo-positioning data may be used to further enrich and filter the transactions identified as potentially fraudulent in block 520, in order to further filter transactions between non-fraudulent transactions and potentially fraudulent transactions. In some embodiments of the invention geo-positioning data may be utilized as a pre-filtering technique for identifying potentially fraudulent transactions. In other embodiments of the invention the geo-positioning data may be utilized as an "Nth" stage fraud filter as previously discussed. However, in other embodiments of the invention a fraud investigator may utilize the geo-positioning data in a more detailed filter used in conjunction with the fraud investigator's specially defined rules for filtering the potentially fraudulent transactions from the non-fraudulent transactions.

In some embodiments, the geo-positioning data includes a location associated with a transaction or an account event. For example, the geo-positioning data may include the address of an ATM transaction, online transaction, in-person transaction, etc. for a transaction or an account event. The geo-positioning data may be based on an IP address, GPS location, RF identifier, etc. associated with a computing device located at a physical address.

It will be understood that the filtered data may be further enriched with any type of data, such as for example the customer behavior. In block 550, the potentially fraudulent transactions may be further filtered based on other attributes to further identify possible fraudulent transactions. In some embodiments, the additional filtration using other attributes is associated with the "Nth" stage fraud filtration as described above with respect to FIG. 1. The additional filtration illustrated in block 550, may include rules based on calculations, algorithms, or any type of formula for eliminating subsets of data from a data pool based on specified criteria. Examples of filtering based on other attributes include a transaction amount, time period (e.g., the last day of the month, a 24 hour period, etc.), location associated with a transaction, an account number, a card number, and combinations thereof. It will be understood that the additional filtering includes one or more rules and/or filter criteria. In some embodiments, the additional filtering includes different values of the same rules associated with first rule filtering in bock 520.

FIG. 5B illustrates a flow chart of another fraud analysis method utilizing a geo-positioning 1500 in accordance with one embodiment of the invention. It will be understood that one or more devices, such as one or more mobile devices and/or one or more other computing devices and/or servers, can be configured to perform one or more steps of the fraud analysis method utilizing a geo-positioning 1500. As discussed above with regard to FIG. 5A, financial transaction data is received as shown in block 1510.

In block 1520, the transaction data is filtered based on a first rule in a first filtering stage to produce filtered data comprising possible fraudulent transactions as described above with regard to block 520 in FIG. 5A. In block 1530, at least one location of a transaction or account event (which could be fraudulent or legitimate) associated with the potentially fraudulent transaction identified in the first stage filtering is determined. For example, the first location could be the location of the potentially fraudulent transaction identified in block 1520, or it could be a location of another transaction or account event. The at least one location can be determined in any way. For example, a report may be received from a transaction device, a place of purchase, a business, a third party, or the like indicating the location of the one or more transactions being investigated as potentially fraudulent identified from the filtered transactions in the first stage. In some embodiments, the determination of the at least one location is based on an IP address, GPS location, bank branch location, ATM location, etc. associated with a system used for a transaction.

In block 1540 of FIG. 5B a second location of a transaction or account event (which could be fraudulent or legitimate) associated with the potentially fraudulent transaction identified in the first stage filtering is determined. For example, all of the transactions or account events associated with the account (i.e. or any related account) of the customer associated with the potentially fraudulent transaction identified as occurring at the first location are investigated to determine if another transaction or account event occurred at a second location that could be deemed to indicate that the potentially fraudulent transaction at the first location is indeed fraudulent (or not fraudulent). The first location of the potentially fraudulent transaction or account event is compared with the second location of the associated transaction or account event to identify potentially fraudulent transactions. For example, in some embodiments, the distance between the first location associated with the potentially fraudulent transaction and the second location of a transaction or account event is determined in order to identify if the first potentially fraudulent transaction occurred at a distance from the second location that would indicate that first potentially fraudulent transaction is in fact likely fraudulent.

The first and second locations can be compared in a number of different ways. The comparison of the transactions at two or more locations may take into account distances between the locations, the types of transactions or account events taken, the channels use, etc. For example, the place of work and domicile of the user and/or the locations of transactions occurring in the past can be compared to the locations of more current transactions occurring to determine any inconsistencies. In some embodiments, a time stamp associated with the one or more transactions is used. For example, if an online transaction occurs at 3:45 pm using a device associated with an IP address located in California, a money withdrawal from an ATM occurring at 4:42 pm on the same day over thousands of miles away in Florida would be suspicious and identified as fraudulent.

It will be understood that the filtered data may be further enriched with any number of other attributes to identify potentially fraudulent transactions. In block 1550, the transaction data may be further filtered based on other attributes to further identify possible fraudulent transactions.

FIG. 5C is a block diagram illustrating a plurality of locations associated with a filtering system according to embodiments of the invention. A user 572 is associated with a first location 570 as shown in FIG. 5C. The first location 570 may include a specific address, a town, a county, a state, other region, or a location at which a transaction or account event occurred. The user 572 may be an account holder being domiciled in the first location 570. Also shown is a mobile device 574 that is associated with the user 572. The mobile device 574 includes an IP or mobile IP address and phone number. In some embodiments, the IP address and/or phone number are associated with the first location 570. In some embodiments, the user 572 uses the mobile device 574 to access an online account, make a transaction, and/or process an account event. The mobile device 574 or other system at which the transaction or account event occurred may be used to identify the location of the user 572

FIG. 5C further illustrates an unauthorized user 582 associated with a second location 580. An ATM 584 associated with the second location 580 is also shown. In the illustrated embodiment, the second location 580 is different from the first location 570. However, it will be understood that the second location 580 may be the same as the first location 570. For example, in some embodiments, the second location 580 is separated from the first location 570 by a distance. Also shown in FIG. 5C is an agent 592 of the user 572. The agent 592 may include a household member, a co-worker, a partner, an employer, and employee, an accountant, or any other agent acting on behalf of the user 572. The agent 592 may include one or more individuals or organizations. The agent 592 is associated with a third location 590. The third location 590 may be the same as or different from the first location 570 and the second location 580. A computer device 594 associated with the agent 592 and/or the third location 590 is also shown. In some embodiments, the agent 592 uses the computer device 594 to access the online account of the user 572.

As an example, the user 572 uses the mobile device 574 to access an online account to check the balance in a savings account at 9:30 am on a certain day at the first location 570. The unauthorized user 582 uses a duplicated or misappropriated debit card 586 that is associated with the online account of the user 572 to fraudulently withdraw cash from the ATM 584 at 9:42 am. The fraudulent withdrawal occurs on the same day as the 9:30 am balance inquiry and 950 miles away at the second location 580. Further, at 10:29 am of the same day, the agent 592 uses the computer device 594 to access the online account of the user 592 and makes a payment. The IP address associated with the computer device 594 indicates that the third location 590 is over 2,000 miles away from both the first location 570 and the second location 580. A comparison is made of the locations associated with the mobile device 574, the ATM 584, and the computer device 594, as well as the times and dates of the balance inquiry, the payment, and the ATM withdrawal. An identification of a fraud is made and a fraud alert is sent to the user 572 or financial institution party responsible for responding to fraud alerts.

In some embodiments, the ATM withdrawal made by the unauthorized user 582 is prevented automatically, invalidated, and/or a hold may be placed on the account 586. Furthermore, a hold may be placed on the online account activity taken by the agent 592. In other embodiments, the user 572 may be required to respond to the fraud alert. For example, the user 572 may contact the financial institution associated with the online account to indicate that the agent 592 making the payment was acting under her authority and that the ATM withdrawal was fraudulent. The user 572 may further instruct the financial institution to cancel the card 586.

Referring now to FIG. 5D, an ATM is illustrated in accordance with embodiments of the invention. The ATM 584 includes a card reader 1572 comprising a slot 1574; a graphical user interface (GUI) 1576; a fraud alert message 1578; and a camera 1580. In one example, the unauthenticated user (e.g., the unauthenticated user 582) inputs a card (e.g., card 586) into the slot 1574 to access an account associated with the card. The data read off of the card by the card reader 1572 is sent to a filtering system (e.g., the multi-stage filtering platform system 380) for analysis. Upon identification of the transaction as a fraud, the filter system sends instructions to the ATM 584 to display the fraud alert message 1578 on the GUI 1576. In some embodiments, the ATM stores the card in the machine and does not return the card to the unauthorized user 582. In still other embodiments, the camera 1580 captures an image or video stream of the unauthorized user 582 to identify the unauthorized user 582.

In some embodiments, velocity data associated with the financial transactions may be utilized in the multi-stage filtering process for identifying potentially fraudulent transactions. As noted above, velocity data is an aspect of customer behavior that refers to the number of transactions or cumulative amounts of transactions associated with an account or related accounts that occurs within a specified period of time.

The velocity data may be utilized in any manner within the multi-stage filtering process. For instance, in some embodiments, predetermined values and transaction counts for velocity data are set within the multi-stage filtration platform application 390 that may automatically "trigger" or "flag" any transaction that exceeds the predetermined values and/or counts without regard to other customer specific information. In such embodiments, any transaction that exceeds the predetermined acceptable velocity values and/or counts may be forwarded to the next filtration stage, or, if occurring in the final stage, the a fraud-detection related action may be taken, such as the transaction may be declined, the customer contacted for further verification, etc.

However, in other embodiments, the manner in which the velocity data is utilized in a filtration stage may be dependent upon any number of other attributes associated with the transaction. For example, if a particular customer has a history of a large number of transactions within certain time periods, the velocity "triggering" values and/or count may be altered accordingly in comparison to that of an average customer. Thus, in such embodiments, the manner in which the velocity data is utilized within the multi-stage filtering platform is fluid and the velocity data is evaluated by taking into account one or more other attributes of the financial transaction(s) and/or customer(s) involved in the transaction. In some instances, it is preferred to utilize velocity data in conjunction with other attributes of the transaction(s) or customer(s) to better individualize evaluation of each transaction and to reduce instances of false positives.

The velocity data analyzed may include strictly the quantity (i.e. velocity count) of transactions within a specified time period (e.g., 5+ transactions within an hour, 20+ transactions within a day, etc.). However, the velocity data analyzed may additionally include a cumulative amount aspect (e.g., 5+ transactions totaling more than $1,000 within an hour, 10+ transactions totaling more than $5,000 within a day, etc.). Furthermore, the velocity data analyzed may additionally include a count of transactions that are each over a specified amount (e.g. 20+ transactions all over $100 each). Of course, as noted above, the "triggering" values that indicate potential fraud when analyzing velocity data may be fluid and drastically different for different customers. In one example, 5+ transactions totaling $500+ may indicate transaction(s) for one customer (e.g. for an individual customer) are potentially fraudulent whereas 50+ transactions totaling $100,000+ may not be indicative of possible fraudulent transaction(s) for another customer (e.g. for a large business customer).

Of note, as explained above, if upon analyzing velocity data, the transaction(s) is deemed potentially fraudulent due to exceeding acceptable velocity values and/or count; the transaction(s) is not necessarily declined or marked fraudulent. Instead, transactions that cannot be cleared for processing or marked fraudulent in the fraud filtration stage in which the velocity data is analyzed may proceed to the next fraud filtration stage (and subsequent stages) until the transaction(s) is deemed not fraudulent, fraudulent, further authorization required, etc. following the final filtration stage.

The individual fraud filtration stages in the multi-stage process are not necessarily independent of one another with respect to making a determination of whether a transaction should be determined to be fraudulent or not fraudulent. For example, if analysis of velocity data within a filtration stage indicates that a transaction may be questionable for slightly exceeding an acceptable value and/or count, the transaction may be more easily identified as being fraudulent or not fraudulent following further filter analysis of other attributes in one or more subsequent filtration stages. On the other hand, if analysis of velocity data within a filtration stage indicates a transaction may be highly questionable for greatly exceeding an acceptable value and/or count, the transaction may be determined to be fraudulent in that particular filtering-stage without having to subject the transaction to additional scrutiny of other attributes in additional filtration stages.

Furthermore, analysis of velocity data in one filtration stage does not preclude analysis of velocity data in other filtration stages. For example, in one embodiment, velocity data is analyzed at a low level in a first stage or preliminary filtration, and thereafter, velocity data is more stringently analyzed in a subsequent filtration stages if the transaction proceeds to such a stage. Additionally, one aspect of velocity data may be analyzed in one filtration stage (e.g., strictly the quantity of transactions in a time period) whereas another aspect of velocity data may be analyzed in a different filtration stage (e.g., quantity of transactions in relation to the cumulative amount of the transactions within a time period).

FIG. 6 illustrates a process 600 that includes velocity data as an attribute that is evaluated in at least one filtration stage in the multi-stage process. At block 610, financial transaction data is received for a plurality of financial transactions, as previously described herein. Of note, the data received is related to transactions that are sent to the financial institution for processing or that the financial institution is sending to other financial institutions for processing. The data may be received over any time period and is not limited to a specific moment. The transactions may be received from any channel such as POS transactions, ATM transactions, Internet transaction, other financial institution, etc. The transaction data captured from the transactions may be generally received by the associated financial institution or a third-party specifically for fraud analysis.

At block 620, a first stage fraud filtration is executed in order to determine potentially fraudulent transactions. The first stage fraud filtration is previously described above with respect to FIGS. 1 and 2. In some embodiments, the velocity data may be included in the one or more attributes that are evaluated in the first stage, whereas in other embodiments, velocity data is not analyzed in the first stage filtration, and other attributes are analyzed in order to provide a pre-filtering of the transaction data received by the financial institution for identifying potentially fraudulent transactions.

At block 630, velocity data associated with one or more transactions pertaining to one or more financial accounts is received. For the transactions that were identified as potentially fraudulent in the first stage filtering described in block 620, associated velocity data may be retrieved manually or automatically by the financial institution.

Upon receiving the velocity data, the process proceeds to block 640 where at least a portion of the financial transactions identified as being potentially fraudulent in the first stage filtering are further filtered utilizing the velocity data, as described above. Block 640 in process 600 illustrates execution of a fraud filtration stage where velocity data is utilized as a filtration attribute. Importantly, while FIG. 6 illustrates the velocity filtration as a "second" fraud filtration stage in the process 600, it should be noted that the term "second" utilized here simply indicates a filtration stage that is subsequent to the first stage filtration. There may be any number of filtration stages or other steps in the process 600 that occur prior to or subsequent to the step indicated at block 640 in which velocity data is evaluated. In other embodiments, the "second" fraud filtration stage may be a sub-set of the first stage filtration or be done concurrently with the first stage filtration.

In block 650, the potentially fraudulent transactions may be further filtered based on other attributes to further identify possible fraudulent transactions. In some embodiments, the additional filtration using other attributes is associated with the "Nth" state fraud filtration as described above with respect to FIG. 1. The additional filtration illustrated in block 650, may include rules based on calculations, algorithms, or any type of formula for eliminating subsets of data from a data pool based on specified criteria. Examples of filtering based on other attributes include a transaction amount, time period (e.g., the last month, a 24 hour period, etc.), location associated with a transaction, an account number, a card number, customer history, customer information, account events, etc. or combinations thereof. It will be understood that the additional filtering includes one or more rules and/or filter criteria. In some embodiments, the additional filtering includes different values of the same rules associated with first rule filtering and/or the velocity filtering in bocks 620 and 640.

In other embodiments of the invention, other process may be utilized that incorporate velocity data in the fraud filtration process. For example, in one embodiment a preliminary fraud filtration is executed. The preliminary filtration, as described previously, may include a single stage or a multi-stage filtration designed to identify transactions that may be readily processed and not unduly burden the more detailed fraud processing performed by fraud investigators. Upon the preliminary fraud filtration evaluation, at least a portion of the financial transactions are identified as being potentially fraudulent transactions. After the preliminary filtering processing a more detailed filtering evaluation performed by the fraud investigators may be conducted on the potentially fraudulent transactions identified in the preliminary filtering process. Of note, the preliminary filtering may include one stage or multi-stage filtering, any of which may include evaluation of velocity data. Furthermore, the velocity data may be utilized in the more detailed evaluation preformed by the fraud investigators, which may also include one stage or multi-stage filtering.

In some embodiments, customer history data for the customer associated with a potentially fraudulent transaction is utilized in the multi-stage filtering to further identify potentially fraudulent transactions. As noted above, customer history may be a subset of customer behavior, and it refers to the customer's historical patterns in financial transactions related to one or more of the customer's accounts. Customer history data may include any type of past transactional patterns such as patterns of transfers of funds from one account to another account, types of transactions that the customer generally engages in, types of transactions the customer generally avoids, transactional patterns in relation to a specific time period during the day, month, year, etc., transactional channels generally utilized or avoided, etc. Of course, customer history data may be utilized in more than one filtration stage in the multi-stage process, including the preliminary filtration stage or stages, and/or more detailed stages of analysis performed by fraud investigators.

The customer data may be utilized in any manner within the multi-stage filtering process. Each transaction request may be evaluated for inconsistencies in the customer's past behavior. An inconsistency may be a "trigger" or "flag" that requires the transaction to proceed to a subsequent filtration stage or identifies the transactions as a fraudulent transaction. On the other hand, a transaction request that is consistent with past customer behavior may be a validation that a transaction that was initially indicated as potentially fraudulent based on other attributes of the transaction or customer in previous filtration stage(s) is in fact not a fraudulent transaction.

The weight that the customer history is given in a particular filtration stage may be determined by a fraud investigator using the multi-stage filtration process. Indeed, more weight may be given to certain aspects of customer history and less weight given to others. For example, an Internet transaction may be closely scrutinized for a customer that generally avoids Internet transactions, whereas a one-time transfer of an insignificant amount of funds to a newly linked account may not be scrutinized as closely even though the behavior is inconsistent with the customer history.

As noted above, transactions that are deemed to be potentially fraudulent based at least in part on customer history in a particular filtration stage are not necessarily ultimately determined to be fraudulent. If the transaction "fails" the filtration stage that utilizes customer history data, the transaction, in some embodiments, may proceed to an additional stage of filtration until the transaction is either identified as not fraudulent or fraudulent. Once the transaction is filtered at the final stage and is determined to be fraudulent a fraud-detection action is taken with respect to the fraudulent transaction, as explained in further detail later.

FIG. 7 illustrates a process 700 that utilizes customer history as an attribute that is evaluated in at least one filtration stage in the fraud detection process. As illustrated by block 710, financial transaction data is received that is related to a plurality of financial transactions that are being received from other financial institutions for processing or being sent to other financial institutions for processing. As previously discussed herein, the transaction data may be received over any time period from any transaction channel.

At block 720, a first stage fraud filtration is executed as previously described herein, for example with respect to FIGS. 1 and 2. In some embodiments, the customer history data may be included in the one or more attributes that are evaluated in the first stage in order to identify potentially fraudulent transactions. In other embodiments, customer history data is not analyzed in the first stage filtration, and instead other attributes are analyzed in order to provide a pre-filtering of the transaction data received by the financial institution for identifying potentially fraudulent transactions.

At block 730, customer history data associated with one or more transactions pertaining to one or more financial accounts is received. For the transactions that were identified as potentially fraudulent in the first stage filtering described in block 720, associated customer history data may be retrieved manually or automatically by the financial institution.

Upon receiving the customer history data, the process proceeds to block 740 where at least a portion of the financial transactions identified as being potentially fraudulent in the first stage filtering are further filtered utilizing the customer history data, as described above. Block 740 in the process 700 illustrates execution of a fraud filtration stage where customer history data is utilized as a filtration attribute. Importantly, while FIG. 7 illustrates the customer history filtration as a "second" fraud filtration stage in the process 700, it should be noted that the term "second" utilized here simply indicates a filtration stage that is subsequent to the first stage filtration. There may be any number of filtration stages or other steps in the process 700 that occur prior to or subsequent to the step indicated at block 740 in which customer history data is evaluated. In other embodiments, the "second" fraud filtration stage may be a sub-set of the first stage filtration or be done concurrently with the first stage filtration.

In block 750, the potentially fraudulent transactions may be further filtered based on other attributes to further identify possible fraudulent transactions. In some embodiments, the additional filtration using other attributes is associated with the "Nth" stage fraud filtration as described above with respect to FIG. 1. The additional filtration illustrated in block 750, may include rules based on calculations, algorithms, or any type of formula for eliminating subsets of data from a data pool based on specified criteria. Examples of filtering based on other attributes include a transaction amount, time period (e.g., the last month, a 24 hour period, etc.), location associated with a transaction, an account number, a card number, and combinations thereof. It will be understood that the additional filtering includes one or more rules and/or filter criteria. In some embodiments, the additional filtering includes different values of the same rules associated with first rule filtering or the filtering utilizing customer history data in bocks 720 and 740.

In other embodiments of the invention, other process may be utilized that incorporate customer history data in the fraud filtration process. For example, in one embodiment a preliminary fraud filtration is executed. The preliminary filtration is as described previously may include a single stage or a multistage filtration designed to identify transactions that may be readily processed and not unduly burden the more detailed fraud processing performed by fraud investigators. Upon the preliminary fraud filtration evaluation, at least a portion of the financial transactions are identified as being potentially fraudulent transactions. After the preliminary filtering processing a more detailed filtering evaluation performed by the fraud investigators may be conducted on the potentially fraudulent transactions identified in the preliminary filtering process. Of note, the preliminary filtering may include one stage or multi-stage filtering, any of which may include evaluation of customer history data. Furthermore, the customer history data may be utilized in the more detailed evaluation preformed by the fraud investigators, which may also include one stage or multi-stage filtering.

In FIG. 8, the methods described in FIGS. 4, 5A, 5B, 6, and 7 may be continued to illustrate how the potentially fraudulent transactions are dealt with after they have been through all of the filtration stages and/or been identified as being fraudulent. In block 810, a fraud alert is generated. The fraud alert may include a general communication or a detailed communication that is sent to the customer, as illustrated by block 820. For example, the fraud alert may indicate that the user should contact an affiliate and/or third party, such as a customer specialist of the financial institution, or the alert may provide details of a potential fraudulent transaction such as the location, data, and time of a suspicious transaction or account event. Examples of the fraud alert include: a recommendation or notification of an account closure, a card cancelation notification, a transaction cancelation, suspension, or hold notification, an online security setting change; a notification of one or more suspicious transactions; a request that the user contact an account specialist; an identification request; a card or account verification; a transaction verification request; and the like. In some embodiments of the invention, as illustrated by block 830, the customer may tell the affiliate and/or third party that the transaction is fraudulent, and thereafter, the affiliate and/or third party may take the appropriate actions.

In other embodiments of the invention, as illustrated in block 830, the fraud alert generated in block 810 may be directly sent to an affiliate and/or third party. The affiliate and or third party may include a branch of a financial institution, an employee of a financial institution, a partner of a financial institution, a business, an outside security firm, a government agency, another financial institution, the authorities, and the like. In some embodiments, the affiliate and/or third party may take further action related to the fraud alerts as the affiliate and/or third party deems necessary. For example, as illustrated by block 820 the affiliate and/or third party may send the fraud alert to the user, another third party, a point of sales device, a transaction device, a business, and the like. In some embodiments of the invention, the affiliate and/or third party may be able to decline the transaction request before the transaction occurs, as illustrated by block 840. For example, a business may decline a misappropriated check upon receiving a fraud alert. In other embodiments of the invention, the transaction may have already occurred so the affiliate and/or third party may take action on the customer account, channel, future transactions, etc. from which the fraudulent transaction originated, as illustrated by block 850.

In block 860, in some embodiments of the invention, fraud alert preferences are received from a customer in a number of different ways, such as but not limited to from an online account associated with the user, by telephone, fax, in-person at a banking center, or by any other method. For example, the user may access an online account by inputting a username and password to choose preferences. The user is an account holder, an agent of the user, a customer of a financial institution or business, and/or any other individual or organization that has the right or authority to conduct a transaction associated with an account. The fraud alert preferences include channels for receiving a fraud alert, the time of the alert, or any other preference associated with the fraud alert.

Examples of the fraud alert preferences include: the method of receiving the fraud alert such as text, automated or in-person phone call, email, and/or mail; the timing of receiving the fraud alert (immediate, after 5 pm, etc.); the contents of the fraud alert (e.g., a general or detail message); whether to take action, take no action, or take action after receiving further instructions; the timing of the action to be taken; the action to be taken once the fraud threat is identified such as immediate cancellation of a card, account, or transaction; criteria for triggering the alert such as threshold monetary amount; and the like. As illustrated by block 870, after identifying a potentially fraudulent transaction related to one or more of the customer's accounts the financial institution systems 370 may take an action with respect to the potentially fraudulent transaction as indicated by the customer preferences. For example, in some embodiments, the fraud alert preferences include a triggering event, such that when the triggering event occurs the multi-stage filtering platform application 390 will take an action based on the customer preferences received. For example, the user may choose to be sent a text message if a credit card is used at a location outside of the United States.

In some embodiments of the invention, as illustrated by block 880, as soon as a potentially fraudulent transaction is identified by the multi-stage filtering platform application 390, the financial institution processing system 370 may send a message to a transaction device directly to prevent a potentially fraudulent transaction from occurring before the transaction is approved. Therefore, in some embodiments the transaction request may be declined before the transaction is complete, or in other embodiments the transaction may be declined after the transaction is completed but before the financial institutions process it. For example, the transaction request may be declined before an unauthorized user has received money from an ATM or after fraudulent purchases are made using a misappropriated credit card. In some embodiments, the transaction request may be declined automatically. For example, the transaction request may be automatically declined if the transaction meets a predetermined transaction amount, if a suspicious transaction occurs at a specific time and/or location (or does not occur at a specific time and/or location), or if the online account security has been breached. In other embodiments, the transaction request is declined based on the geo-positioning data, customer history, account event, velocity data, and/or other attribute described herein. For example, the transaction request may be declined because the transaction is associated with a particular location (e.g., Libya) that is prohibited by law or the transaction is a transaction that could not be made based on the geo-location of the customer.

In block 890, in some embodiments of the invention an unauthorized user may be identified if the transaction is deemed potentially fraudulent. The unauthorized user is identified in a number of different ways. For example, in some embodiments, an image or video of the unauthorized user is captured and sent to a third party, where the third party identifies the unauthorized user. Images captured of an unauthorized user using an ATM, for example, may be sent to the proper authority (e.g., the police or government agency) for further investigation. In other embodiments, the unauthorized user is identified based on the geo-positioning data or other attribute described herein. For example, an identification code associated with a device such an IP address, a phone number, or vendor number; a phone number or address associated with a business or individual; a driver's license number; and the like may be used to identify an unauthorized user. In other embodiments of the invention biometrics of the unauthorized user may be taken in order to identify the unauthorized user.

In some embodiments, the financial institution may put a hold on or close an account that is suspected as potentially fraudulent. The account may include accounts associated with a financial institution, an organization, a business, or government agency. Examples of the account include loan accounts; debit accounts; certificate of deposit accounts (CDs); checking accounts; savings accounts; individual accounts; joint accounts; money market accounts; purchase accounts; customer accounts; shipping accounts; service accounts; product accounts; online accounts; business accounts; and the like. The user may have one or more accounts with a financial institution or other organization. In some embodiments, one or more accounts associated with a financial institution may be closed after fraudulent transactions associated with the one or more accounts is identified. For example, an account holder may request that a compromised checking account be closed while still maintaining a savings account. As another example, a user may request that a compromised online account used to make online purchases be closed, as well as bank accounts associated with the online account. In still other embodiments, security settings associated with an account are reset. The security settings include settings, protocol, rules, or codes associated with a computer device, transaction device, server, web browser, operation system, online account, software, building, tokens, key fobs, security cards, and the like. Security settings include online account security settings such as passwords, security questions, and encryption; software settings such as spyware and virus protection settings; building access codes; and the like. For example, a financial institution may reset a compromised online account such that the user must pick a new user name and/or password to access the account.

In other embodiments, instructions are sent to a transaction device as illustrated by block 880, in order to identify an unauthorized user. The instructions can configure the transaction device to notify the user or an unauthorized user of a fraud alert, cancel a transaction, record an image or video of the user of the transaction device, and the like. The unauthorized user may be any user that does not have authorization or permission to access an account, conduct a transaction, and/or act on behalf of the user. The unauthorized user may be an individual, an organization, a business, or any type of user. In an exemplary embodiment, the transaction device (e.g., an ATM) is sent instructions to recapture a card associated with an account. For example, the ATM may keep the card within the machine after it is received. In this way the card is taken away from an unauthorized user to prevent further use of the card. In other embodiments, instructions are sent to the transaction device to configure the device to prompt the user or unauthorized user to input one or more security codes. For example, in addition to requiring a PIN to access an account, the transaction device may further require that the user or unauthorized user input a secondary PIN or answer a security question. The transaction device includes ATM's, POS's, computer devices, smartphones, mobile phones, and the like. The transaction device may be associated with a financial institution, business, third party, or the user.

Turning now to FIG. 9, an embodiment of another method 1000 for multi-stage filtering for fraud detection is illustrated. In this embodiment, once the financial institution receives the financial transaction information as represented by block 1010, a preliminary filtration is executed, block 1020. As noted above, the preliminary filtration is a high-level filtration that may readily eliminate transactions that have a low likelihood of fraud and proceed to process such transactions prior to subjecting the transactions to an unnecessary in-depth fraud evaluation. Again, the preliminary filtration may be a single stage or a series of high-level filtration stages. Thus, once the preliminary filtration is completed, the process 1000 moves to decision block 1025 to evaluate whether there is a likelihood of fraud. If the likelihood of fraud is low, the transaction is processed as represented at block 1050. In other embodiments, if the transaction has already occurred, the transaction is set aside as not being fraudulent, set aside for further analysis later if necessary, etc. Alternatively, if preliminary filtration yields a decision that the transaction warrants further scrutiny, the process 1000 then proceeds to the multi-stage filtering platform 1080.

The multi-stage filtering platform 1080 may be utilized to closely analyze the transaction in question. Any number of attributes, either directly or indirectly, related to the transaction may be evaluated. As discussed in detail above, the multi-stage platform 1080 may employ velocity filtration 1081, non-monetary account changes filtration 1083, customer history filtration 1085, geo-positioning filtration 1087, and/or other transaction data filtration 1089 types.

Importantly, the filtration within the platform 1080 may be a single filtration stage (following the preliminary filtration stage) that incorporates aspects of one or more of the aforementioned filtration types. However, in one embodiment, the multi-stage filtering platform (following the preliminary filtration) includes at least two stages wherein the transaction is evaluated and not subjected to subsequent filtration stages if the transaction can be cleared for processing or identified as not fraudulent after any individual filtration stage in the process. Thus, the overall fraud detection process remains efficient and does not subject the multi-stage filtering platform (or other financial institution commodities) to unnecessary fraud processing burdens.

Of note, while FIG. 9 illustrates a preliminary filtration step 1020 separate from the multi-stage filtration platform 1080, it will be appreciated that the multi-stage filtering platform may incorporate the preliminary filtration stage(s) as well. Furthermore, the filtration types illustrated, such as the velocity filtration 1081, non-monetary filtration 1083, customer history filtration 1085, geo-positioning filtration 1087, and other transaction data filtration 1089, may each be processed as separate stages throughout the process 1000. Conversely, each filtration type may be mixed with one or more other filtration types to form one or more filtration stages, or a single filtration stage that incorporates two or more types of filtrations. Furthermore, in some embodiments, aspects of one or more filtration types are present in multiple stages. Still further, in some embodiments, one or more filtration types are not utilized at all in the process 1000. The filtration types may be present in any filtration stage (including high level aspects in preliminary filtration) and the order of the filtration stages may be in any desired order. In one embodiment, the filtration types, stages, and/or desired order of filtration may be selected by the financial institution administrators and/or fraud investigators managing the fraud detection process. Thus, in some embodiments of the invention after the preliminary filtration is completed the financial institution administrators may determine based on one or more factors how to best investigate potential fraudulent transactions by determining how to filter the transactions further in the additional filtering stages. For example, one fraud investigator may filter transactions from a particular channel utilizing non-monetary account changes, but may filter transactions from another channel using geo-positioning filtration. Another fraud investigator may filter transactions from the same channels as the first fraud investigator utilizing velocity filtration and customer history filtration instead of non-monetary account changes and geo-positioning. The first fraud investigator may find that a particular transaction may not be fraudulent using one filter but the second fraud investigator may find that the same transaction is fraudulent based using the different filters. Thus, in some embodiments, the multi-stage filtering allows different fraud investigators to identify fraudulent transactions with more accuracy, using fewer costs, in less time then standard fraud detections systems and processes, etc.

As illustrated, once the process 1000 executes the final filtration stage within the multi-stage filtering platform 1080, the process advances to a final decision block 1025. If the transaction is cleared as not likely fraudulent at the last filtration stage the transaction is processed at block 1050, or set aside as not fraudulent if the transaction has already been processed. Otherwise, if the transaction is deemed to be potentially fraudulent, the transaction request is declined, as represented at block 1060, or marked at fraudulent if the transaction has already occurred. A fraud alert may be generated, as represented by block 1070, or other fraud-detection action may be taken.

Turning to FIG. 10, a computer-implemented method 1100 of determining if a fraud alert is a false positive is provided. This process may differ from the processes described in FIGS. 1, 2 and 9, such that instead of identifying potentially fraudulent transactions from a set of transactions deemed initially not fraudulent, this process may identify if a transaction that was initially deemed fraudulent is actually a non-fraudulent transaction. The process ends with the same results, which is a group of potentially fraudulent transactions, but the methods of identifying the fraudulent transactions are accomplished in a different way.

A false positive is a financial transaction that has been flagged with a fraud alert by a primary financial institution or by a secondary financial institution that shares information with the primary financial institution. As discussed herein, false positives are both inconvenient for users and expensive for the financial institution because transactions may be denied based on the false allegation of fraud. The false positives cost the customer time in dealing with denied transactions and cost the financial institution money in not only investigating the fraud but also due to customer dissatisfaction.

False positives differ from other transactions that the multi-stage filtering system evaluates because false positives have, for some reason, already been flagged as fraudulent. Thus, false positives likely include one or more characteristics that suggest potentially fraudulent behavior. Additionally, because the financial institution has already been alerted to the potential for fraud in the transaction, the financial institution may be hesitant to process the transaction without a thorough review. For these reasons, the computer-implemented method 1100 of determining if a fraud alert is a false positive includes stringent criteria for identifying false positives. The computer-implemented method 1100 includes a plurality of fraud filtrations to generate fraud alerts and identify the fraud alert as a false positive after processing the plurality of fraud filtrations. Even after preliminarily identifying a false positive, in some embodiments the computer-implemented method 1100 queries the user or the financial institution for instructions on how to respond to the false positive. The computer-implemented method 1100 combines many safeguards to protect users' financial transaction with a robust method of detecting false positives, thereby reducing inconvenience to the users and costs to the financial institutions.

In one embodiment of the invention, generally, the computer-implemented method 1100 determines if a fraud alert is a false positive by receiving financial transaction information, wherein the financial transaction information includes a fraud alert; executing a first stage fraud filtration on the financial transaction information; and determining if a risk of fraud is above a pre-defined threshold based on the first stage fraud filtration. If the risk of fraud is not above the pre-defined threshold, indicating a possibility that the fraud alert is a false positive, the computer-implemented method enriches the financial transaction information with supplemental information; executes a plurality of successive fraud filtrations using the financial transaction information with the supplemental information; and determines if the risk of fraud is above the pre-defined threshold based on the plurality of successive fraud filtrations. Further, the computer-implemented method determines if the fraud alert is a false positive based on the risk of fraud considering the first and successive stage fraud filtrations.

More specifically, in block 1102, the computer-implemented method 1100 receives the financial transaction information, wherein the financial transaction information includes a fraud alert. The transaction information may be received from any channel such as point of sale (POS) transactions, automated teller machine (ATM), Internet transaction, legacy fraud detection systems that may or may not work in conjunction with the multi-stage filtering platform application, etc.

The transaction information, in some embodiments of the invention, includes a fraud alert generated by conventional means at the primary financial institution or by any other means at the secondary financial institution, user, or merchant. For example, the financial institution may receive a list of check transactions provided by a check processor. The check processor may flag some of the check transactions as fraudulent based on their own fraud detection system. The financial institution, however, may evaluate the flagged transactions to determine whether the fraud alerts on the flagged transactions are false positives.

Turning now to block 1104, the computer-implemented method 1100 executes a first stage fraud filtration on the transaction that has been flagged with a fraud alert. As discussed above, the first stage fraud filtration is a preliminary filtration that evaluates the financial transaction to determine whether the transaction can easily be excluded from further analysis. When attempting to identify potentially fraudulent transactions, the first stage fraud filtration may determine whether the transaction amount is too little to indicate a risk of fraud or too little to warrant investigating whether the transaction is fraudulent. When attempting to identify a false positive, however, the first stage fraud filtration may determine that the transaction amount is too large to process the transaction without proceeding through enhanced fraud identification and confirmation steps. For example, the financial institution may receive a balance transfer request for $50,000 from a second institution and the second institution indicates that the balance transfer request may be fraudulent. In an attempt to reduce false positives, the computer-implemented method 1100 will evaluate this transaction to determine whether the fraud alert from the second institution is incorrect. At the first stage fraud filtration, however, the method 1100 determines that a potentially fraudulent transaction of $50,000 is not a false positive and sends the transaction to enhanced identification and confirmation steps. The first stage fraud filtration 1104 quickly alerts the financial institution to transactions that merit further review to determine whether fraud is present.

In an embodiment depicted in block 1106, the computer-implemented method 1100 determines whether the risk of fraud is above a pre-defined threshold based on the first stage fraud filtration. The risk of fraud may be based on the transaction location, the transaction amount, or any of the other criteria discussed herein regarding methods of identifying fraudulent transactions. The computer-implemented method 1100 compares the characteristics of the potentially fraudulent transaction to pre-defined thresholds to determine a risk of fraud and whether the risk of fraud is above the pre-defined thresholds. For example, the transaction may originate from a location known to typically originate fraudulent transactions. Certain locations may be included in a list of high fraud locations and hence the computer-implemented method determines that the risk of fraud is above the pre-defined threshold based on the originating location of the transaction and the list of high fraud locations.

In one embodiment of the invention, the risk of fraud may be above a pre-defined threshold and the transaction may merit further review because the cost of incorrectly identifying a transaction as a false positive would be too high. For example, improperly processing a fraudulent transaction worth $50,000 is a greater expense risk to the financial institution than evaluating the transaction using enhanced identification and confirmation steps, (e.g., having an employee call the user and ask whether the transaction is authentic or requiring notarization of documents related to the transaction), and then preventing the fraudulent transaction. It should be understood that $50,000 is used merely as an example and any amount may be included in the first stage fraud filtration. For example, $20,000, $100,000, $500,000 or any other amount may be used to identify transactions that automatically warrant enhanced scrutiny in the first stage fraud filtration 1106. In some embodiments, the amount relates to the costs borne by the financial institution to investigate the potentially fraudulent transaction and the costs incurred by the user.

In other embodiments, velocity data, customer history data, customer information, account events, etc. may individually or collectively be used in the first-stage or multiple stages of filtration to quickly eliminate transactions that are not false positives and that merit enhanced scrutiny. In some embodiments of the invention, when the first-stage fraud filtration determines that the risk of fraud is above the pre-defined threshold for any or all of these criteria, a fraud alert may be generated 810. If, however, the first-stage filtration does not indicate that the risk of fraud is above a pre-defined threshold then the computer-implemented method 1100 executes a second-stage fraud filtration, as depicted in block 1108.

In some embodiments, the second-stage fraud filtration includes enriching the financial transaction information with supplemental information. The supplemental information can come from the financial institution or from a third party and can relate to any or all of the attributes used to evaluate the transactions for fraud, as described herein. For example, the financial transaction information may be supplemented with customer history data to indicate that the user transfers $2,000 every month to another account. If a secondary financial institution provides information to the financial institution about the $2,000 transfer but indicates that it is potentially fraudulent, the computer-implemented method 1100 may evaluate the transaction and the supplemental information that the user historically transfers $2,000 every month. While this alone may not be enough to indicate that the transaction is a false positive, the second-stage filtration may not indicate that the risk of fraud is above the pre-defined threshold based on the customer history data and may not generate a fraud alert immediately.

In some embodiments, the computer-implemented method 1100 may evaluate the transaction based on additional criteria. As discussed previously, the higher-level filtration can occur at a second stage, a third stage, up to an "Nth" stage 1110. Each time, the computer-implemented method 1100 evaluates different attributes that are potentially related to the potentially fraudulent transaction and determines whether the risk of fraud is above some pre-defined threshold related to the criteria, as depicted in decision blocks 1106. If at any point the risk of fraud is above the pre-defined threshold for the criteria being evaluating, e.g., location, velocity, customer history, etc., then a fraud alert is generated 810, or in other embodiments of the invention other actions are taken as previously described with respect to FIG. 8.

If, however, after the "Nth" stage filtration 1110, the risk of fraud for the transaction is still not above the pre-defined thresholds for all of the criteria evaluated then the computer-implemented method 1100 indicates a false positive 1112 has occurred and the transaction is processed if it hasn't already been processed and/or the transaction is set aside as not fraudulent. Therefore, in one embodiment, when a false positive is indicated 1112, the computer-implemented method 1100 processes the transaction normally 150; however, in other embodiments, when the computer-implemented method 1100 indicates that the transaction is a false positive 1112 the transaction is set aside as not being fraudulent 1114.

Turning now to FIG. 11, additional steps in the method 1100 of identifying false positives are provided, in accordance with some embodiments of the invention. In one embodiment of the invention, the action taken in response to indicating a false positive 1112 may be dependent upon user preferences or financial institution defaults. In one embodiment, users provide user preferences regarding how the financial institution should respond to identifying a false positive. The users can provide the user preferences online, in person, through the mail or telephone, or in any other manner of providing preferences to the financial institution.

When the financial institution indicates a false positive 1112, the financial institution reviews user preferences as depicted in block 1122. If the user has provided user preferences, the financial institution responds to the false positive in the manner instructed by the user. If, however, the user has not provided user preferences or if the financial institution determines that responding to false positives in another manner, such as by financial institution defaults, is appropriate then the financial institution may respond to the false positive differently.

In one embodiment of the invention, the options available to the computer-implemented method 1100 when a false positive is identified include: (a) processing the transaction 1124; (b) performing confirmatory review 1126; (c) requiring enhanced user authentication 1128; (d) declining the transaction request 1130; and (e) alerting the user 1132. These options may be included in the user preferences 1136 provided by the user or they may be financial institution defaults. Any combination of these responses is also available to the financial institution when responding to the false positive.

In block 1124, the computer-implemented method 1100 may process the transaction after indicating a false positive. For example, a financial institution may receive a transfer request from another financial institution that is accompanied by an indication that the transfer request may be fraudulent. The financial institution, through the computer-implemented method 1100, may determine that the transfer request is a false positive and is not in fact fraudulent. At this point, the financial institution may process the transaction normally, saving the financial institution costs associated with a full-scale investigation of the transfer request and saving the customer frustration and inconvenience by correctly processing a valid transaction.

In block 1126, the computer-implemented method 1100 may perform a confirmatory review after indicating a false positive. A confirmatory review may be anything from a low cost review of the transaction to confirm that the transaction is in fact valid to a confirmation with the second financial institution providing the transaction that the details of the financial information received with the transaction is correct. The user may request a confirmatory review, and in some cases may agree to pay for the confirmatory review, to ensure that a transaction that has been deemed potentially fraudulent by at least one financial institution is double-checked to ascertain its validity. In another embodiment, the financial institution identifies false positives but conducts a confirmatory review for specific categories of false positives, such as for transactions above certain amounts or for certain types of users.

In block 1128, the computer-implemented method 1100 may require enhanced user authentication after indicating a false positive. Enhanced user authentication may be confirmation from the user that the false positive should be processed or that the details of the transaction are correct. Requiring confirmation from the user is another means for determining that the transaction is in fact a false positive. In some embodiments, users may provide preferences that the user desires to be consulted before any transactions that have been flagged as potentially fraudulent are processed.

Turning briefly to FIG. 12, an example 1200 of one method of requiring enhanced user authentication is depicted. In an embodiment, a message 1212 is sent to a user 1208 requiring feedback from the user 1208 to authenticate the transaction. The message 1212 may be sent in the form of a text message, email, phone call, or other type of communication. In an embodiment, the user 1208 is contacted through a mobile device 1202 having a screen 1204 and an input device 1206. The message 1212 is depicted in the screen 1204, as shown in callout 1210. The user 1208 may reply to the message 1212 using the input device 1206 of the mobile device 1202 to confirm that the transaction should be processed. In one embodiment, sufficient details of the transaction are provided in the message 1212 to allow the user 1208 to identify the transaction and confirm whether the transaction is valid.

Turning back to FIG. 11, after the computer-implemented method 1100 performs the confirmatory review 1126, or requires enhanced user authentication 1128, the computer-implemented method 1100 determines whether the financial institution and/or the user has authenticated the transaction, as depicted in decision block 1234. If the computer-implemented method 1100 determines that the transaction is authenticated, i.e., that the transaction is a false positive, then the transaction is processed normally 1124. If, however, the computer-implemented method 1100 determines that the transaction is not authenticated, either by confirmatory review or by user authentication, then the transaction request is declined 1130.

In block 1130, the computer-implemented method 1100 may decline the transaction request. For example, a user may have indicated that the user prefers all transactions that have been flagged as potentially fraudulent be declined. In some embodiments, declining the transaction request puts a fraud alert on all of the user's accounts. In another embodiment, only the transaction flagged as fraudulent is declined and all other transactions are processed as usual for the user.

In block 1132, the computer-implemented method 1100 may alert the user to the false positive. The user may have requested to be alerted whenever a false positive is identified, even if other preferences instruct the computer-implemented method 1100 to process or decline the transaction. In an embodiment, after alerting the user, the computer-implemented method 1100 solicits user preferences and receives them from the user, as depicted in block 1136. For example, the financial institution may email the user to alert the user of the false positive and then solicit user preferences regarding how to deal with false positives in the future.

In FIG. 13, an example 1300 of a means for alerting the user 1308 is provided. The computer-implemented method 1100 emails the user 1308 on the user's computing device 1302. As depicted in callout 1304, the user 1308 receives an email 1306 alerting him that a fraud alert has been triggered for a transaction but that the fraud alert may possibly be incorrect, i.e., a false positive. In some embodiments, an opportunity for the user 1308 to update the preferences is provided, such as a hyperlink 1310 to an online form. In an embodiment, sufficient information, such as the account, the merchant, or the date and time of the transaction is provided so that the user can identify the transaction. It should be understood that these options for responding to a false positive may be combined in many different configurations. For example, the computer-implemented method 1100 may process the transaction 1304 but also alert the user 1312 to the false positive.

Returning to FIG. 11, in some embodiments, after determining whether the transaction is processed or declined, the computer-implemented method 1100 updates the customer history 1138 to enhance fraudulent identification service in general, and for the user, in the future. The options disclosed herein are also not limiting and other potential responses to identifying a false positive are possible.

Some portion of the potentially fraudulent transactions are false positives and result in increased cost and inconvenience for the financial institution and users if not identified early. Thus, the financial institution processing system 370 processes the potentially fraudulent transactions using the method 1100 to identify any false positives. The multi-stage filtering platform 380 identifies the false positives and takes the appropriate fraud-detection action, as described herein, to reduce the inconvenience to customers and the costs to the financial institution.

In some embodiments of the invention, the financial institutions may want to monitor all of the transactions that the financial institution receives in order to most effectively identify potentially fraudulent transactions that may be occurring. However, it takes a great deal of available server capacity, software costs, labor costs, and money to have the ability to monitor all of the transactions received by the financial institution. Therefore, in some embodiments of the invention, the memory capacity of the multi-staged filtering platform system 380 and software seats used for the multi-staged filtering platform application 390 are increased or decreased as necessary to handle the hundreds-of-thousands to millions of transactions that are vary daily at a financial institution. In some embodiments of the invention the multi-stage platform system 380 and multi-staged filtering platform application 390 are scalable, such that during periods of high transactions and periods of low transactions the capacity of the system and application may be changed to improve efficiency, reduce the energy costs, reduce the labor costs, and reduce the software costs of the system 380 and application 390, as well as reserve memory for other applications on other systems, while still being able to receive the transactions for fraud analysis filtering.

FIG. 14 illustrates a transaction capacity process 1400 in accordance with one embodiment of the invention. As illustrated by block 1410, the transactions incoming into the financial institution per unit of time is determined. In this step the financial institution may monitor the incoming transactions on a real-time basis and/or determine the capacity needed for a particular time of day based on the number of transactions that occurred during different times of the day for various days of the year. For example, more transactions than usual may occur on the $15^{th}$, $30^{th}$, and $31^{st}$ of each month because bills are often being paid on these days after people receive their paychecks. In another example, the Friday after Thanksgiving is always one of a number of peak days for transactions because of all of the people that are making purchases on these days due to the store sales that are typically offered.

In one embodiment the financial institution monitors the number of transactions in the queues that are received and sent by the financial institution in real-time and varies the capacity of the system and application as the number of transactions in the queues change. In other embodiments of the invention, instead of, or in conjunction with, monitoring the queues to determine the capacity needed as the queues change, the capacity may be allocated for days or times within a day in the future based on the historical transaction volume trends that have occurred in the past.

As illustrated by block 1420, the financial institution may increase the capacity of the systems that are responsible for filtering data related to the incoming transactions when needed. For example, in some embodiments of the invention the server capacity may be increased in real-time to handle any spikes in the number of transactions that need to be analyzed for fraud as the spikes occur. In order to handle additional transactions the financial institution may increase the memory of the systems by activating additional servers or by allocating additional CPU and/or memory as needed. In addition, as illustrated in block 1430, the financial institution may also increase the number of software seats available when necessary to handle the increased transactions.

As illustrated by block 1440, alternatively, the financial institution may decrease the capacity of the systems that are responsible for filtering data related to the incoming transactions to reduce the energy costs, software costs, and/or labor costs. For example, in some embodiments of the invention the server capacity may be decreased in real-time to handle any dips in the number of transactions that need to be analyzed for fraud as the dips occur. Furthermore, the financial institution may also decrease the memory of the systems by deactivating servers or by reallocating additional CPU and/or memory when it is not needed. In addition, as illustrated in block 1450, the financial institution may also decrease the number of software seats available to reduce costs when the number of transactions decreases.

As illustrated by block 1460, after the capacity of the system and application is determined, the system and application receives the data related to the transactions that the financial institution wishes to analyze to identify the potentially fraudulent transactions. The financial institution may receive the transaction data as previously described above. As illustrated by block 1480, multi-stage filtering, as described herein, may be applied to the transaction data received in order to identify potentially fraudulent transactions, reduce false-positive transactions, and/or reduce the number of potentially fraudulent transactions that need a more detailed multi-stage filtering analysis of the transaction.

Therefore, the capacity in the system and application may be varied so that transactions from multiple products and channels may all be funneled in to the single multi-stage filtering platform system 380 and application 390. In this way, as described herein the financial institution may be able to analyze and filter every transaction that takes place related to the account of the customers of the bank or at least every transaction that is identified initially as potentially fraudulent and/or the transaction that are a high risk of being fraudulent. For example, the financial institution may only analyze and filter transactions received though the most risky channels, regions, customer's accounts, etc.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the invention, however, the computer-readable medium may be transitory, such as, for example, a propagation signal including computer-executable program code portions embodied therein.

One or more computer-executable program code portions for carrying out operations of the invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the invention are written in conventional procedural programming languages, such as the "C" programming languages and/or similar programming languages. The computer program code may alternatively or additionally be written in one or more multi-paradigm programming languages, such as, for example, F#.

Some embodiments of the invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the invention.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method for fraud analysis, the method comprising:
receiving financial transaction attribute data associated with two or more financial transactions, each of the two or more financial transactions being related to one or more customer financial accounts, wherein the attribute data includes financial transaction velocity data associated with a rate at which a plurality of financial transactions occur;
executing, via a computing device processor, a first stage fraud filtration configured to evaluate the two or more financial transactions based on the financial transaction attribute data, wherein evaluating the attribute data of the two or more financial transactions comprises:
determining at least one financial transaction of the two or more financial transactions as being associated with a low risk or no risk transaction;
determining at least one financial transaction of the two or more financial transactions as being associated with a risk greater than a low risk transaction;
receiving account event data associated with one or more events pertaining to one or more financial accounts;
executing, via a computing device processor, a second stage fraud filtration configured to evaluate the at least one financial transaction associated with a low risk or no risk transaction or to evaluate the at least one financial transaction associated with a risk greater than a low risk or no risk transaction based on the account event data; and
determining which of the two or more financial transactions warrant fraud detection-related analysis based on the first and second stage fraud filtration.

2. The method of claim 1, wherein receiving account event data further comprises receiving account authorization credential change data associated with a user's request to change at least one of an account user identification or an account password.

3. The method of claim 1, wherein receiving account event data further comprises receiving financial product order data associated with a user's request to order a financial product, wherein the financial product includes one of personal checks, a debit card, or a credit card.

4. The method of claim 1, wherein receiving account event data further comprises receiving account opening data associated with a user's request to open a financial account.

5. The method of claim 1, wherein receiving account event data further comprises receiving banking session-related data associated with one of a user's online banking session, a user's mobile banking session, a user's automated teller machine (ATM) session or a user's call center session.

6. The method of claim 1, wherein receiving account event data further comprises receiving account personal information change data associated with a user's request to change personal information associated with one of a financial account or a customer profile account.

7. The method of claim 1, wherein receiving account event data further comprises receiving financial account balance inquiry data associated with a user requesting a balance for one or more financial accounts.

8. The method of claim 1, wherein receiving account event data further comprises receiving event location-identifying data that provides for identifying a geographic location of an event associated with the event data.

9. The method of claim 1, wherein receiving financial transaction attribute data further comprises receiving financial transaction attribute data associated with at least one of a plurality of financial institution transaction products, a plurality of financial institution transaction channels or a plurality of financial institution transaction applications.

10. The method of claim 1, further comprising receiving related account data that identifies related financial accounts that are associated by customer name with each of the one or more financial accounts and executing, via a computing device processor, a third stage fraud filtration configured to evaluate the one or more financial transactions based on the related account data.

11. The method of claim 1, further comprising receiving customer data for a customer associated with each of the one or more customer financial accounts and executing, via a computing device processor, a third stage fraud filtration configured to evaluate the one or more financial transactions based on the customer data.

12. The method of claim 1, further comprising executing, via a computing device processor, a third stage fraud filtration, the third stage fraud filtration being configured to evaluate the one or more events based on the financial transaction data and the account event data.

13. The method of claim 1, wherein determining further comprises determine which of the financial transactions warrant automatic generation and communication of a fraud alert.

14. The method of claim 1, wherein determining further comprises determining which of the financial transactions warrant further filtering.

15. The method of claim 1, wherein determining further comprises determining which of the financial transactions warrant fraud detection-related scoring.

16. The method of claim 1, wherein the low risk or no risk transaction is a transaction that is not likely to be fraudulent and includes one of at least a transaction involving a low value transaction, a secure channel transaction, and a preferred customer transaction.

17. An apparatus for fraud analysis, the apparatus comprising:
  a computing platform including a memory and at least one processor in communication with memory;
  a fraud analysis filtration module stored in the memory, executable by the processor and configured to:
  receive financial transaction attribute data associated with two or more financial transactions and account event data associated with one or more events pertaining to one or more financial accounts, wherein the attribute data includes financial transaction velocity data associated with a rate at which a plurality of financial transactions occur;
  execute a first stage fraud filtration to evaluate the financial transactions based on the financial transaction attribute data, wherein evaluating the attribute data of the two or more financial transactions comprises:
    determining at least one financial transaction of the two or more financial transactions as being associated with a low risk or no risk transaction;
    determining at least one financial transaction of the two or more financial transactions as being associated with a risk greater than a low risk transaction
  execute a second stage fraud filtration to evaluate the at least one financial transaction associated with a low risk or no risk transaction or to evaluate the at least one financial transaction associated with a risk greater than a low risk or no risk transaction based on the account event data, and
  determine which of the two or more financial transactions warrant fraud detection-related actions based on the first and second stage fraud filtrations.

18. The apparatus of claim 17, wherein the fraud analysis filtration module is further configured to receive the account event data that includes account authorization credential change data associated with a user's request to change at least one of an account used identification or an account password.

19. The apparatus of claim 17, wherein the fraud analysis filtration module is further configured to receive the account event data that includes financial product order data associated with a user's request to order a financial product, wherein the financial product includes one of personal checks, a debit card, or a credit card.

20. The apparatus of claim 17, wherein the fraud analysis filtration module is further configured to receive the account event data that includes account opening data associated with a user's request to open a financial account.

21. The apparatus of claim 17, wherein the fraud analysis filtration module is further configured to receive the account event data that includes banking session-related data associated with one of a user's online banking session, a user's mobile banking session, a user's automated teller machine (ATM) session or a user's call center session.

22. The apparatus of claim 17, wherein the fraud analysis filtration module is further configured to receive the account event data that includes account personal information change data associated with a user's request to change personal information associated with one of a financial account or a customer profile account.

23. The apparatus of claim 17, wherein the fraud analysis filtration module is further configured to receive the account event data that includes financial account balance inquiry data associated with a user requesting a balance for one or more financial accounts.

24. The apparatus of claim 17, wherein the fraud analysis filtration module is further configured to receive the account event data that includes event location-identifying data that provides for identifying a geographic location of an event associated with the event data.

25. The apparatus of claim 17, wherein the fraud analysis filtration module is further configured to receive financial transaction attribute data associated with at least one of a plurality of financial institution transaction products, a plurality of financial institution transaction channels or a plurality of financial institution transaction applications.

26. The apparatus of claim 17, wherein the fraud analysis filtration module is further configured to receive related account data that identifies related financial accounts that are associated by customer name with each of the one or more financial accounts and execute a third stage fraud filter to evaluate the financial transactions based on the account data.

27. The apparatus of claim 17, wherein the fraud analysis filtration module is further configured to receive customer data for a customer associated with each of the one or more customer financial accounts and execute a third stage fraud filter to evaluate the financial transactions based on the customer data.

28. The apparatus of claim 17, wherein the fraud analysis filtration module is further configured to execute a third stage fraud filtration to evaluate the one or more events based on the financial transaction data and a fourth fraud filtration to evaluate the one or more events based on the account event data.

29. The apparatus of claim 17, wherein the fraud analysis filtration module is further configured to determine which of the financial transactions warrant automatic generation and communication of a fraud alert.

30. The apparatus of claim 17, wherein the fraud analysis filtration module is further configured to determine which of the financial transactions warrant further filtering.

31. The apparatus of claim 17, wherein the fraud analysis filtration module is further configured to determine which of the financial transactions warrant fraud detection-related scoring.

32. The apparatus of claim 17, wherein the low risk or no risk transaction is a transaction that is not likely to be fraudulent and includes one of at least a transaction involving a low value transaction, a secure channel transaction, and a preferred customer transaction.

33. A computer program product including a non-transitory computer-readable medium, the medium comprising:
  a first set of codes for causing a computer receive financial transaction attribute data associated with two or more financial transactions, each transaction related to one or more customer financial accounts, wherein the attribute data includes financial transaction velocity data associated with a rate at which a plurality of financial transactions occur;

a second set of codes for causing a computer to execute a first stage fraud filtration configured to evaluate the two or more financial transactions based on the financial transaction attribute data, wherein evaluating the attribute data of the two or more financial transactions comprises:
  determining at least one financial transaction of the two or more financial transactions as being associated with a low risk or no risk transaction;
  determining at least one financial transaction of the two or more financial transactions as being associated with a risk greater than a low risk transaction;
a third set of codes for causing a computer to receive account event data associated with one or more events pertaining to one or more financial accounts;
a fourth set of codes for causing a computer to execute a second stage fraud filtration configured to evaluate the at least one financial transaction associated with a low risk or no risk transaction or the at least one financial transaction associated with a risk greater than a low risk or no risk transaction based on the account event data; and
a fifth set of codes for causing a computer to determine which of the financial transactions warrant fraud detection-related actions based on the first and second stage fraud filtrations.

34. The computer program product of claim 33, wherein the third set of codes is further configured to cause the computer to receive account authorization credential change data associated with a user's request to change at least one of an account used identification or an account password.

35. The computer program product of claim 33, wherein the third set of codes is further configured to cause the computer to receive financial product order data associated with a user's request to order a financial product, wherein the financial product includes one of personal checks, a debit card, or a credit card.

36. The computer program product of claim 33, wherein the third set of codes is further configured to cause the computer to receive account opening data associated with a user's request to open a financial account.

37. The computer program product of claim 33, wherein the third set of codes is further configured to cause the computer to receive banking session-related data associated with one of a user's online banking session, a user's mobile banking session, a user's automated teller machine (ATM) session or a user's call center session.

38. The computer program product of claim 33, wherein the third set of codes is further configured to cause the computer to receive account personal information change data associated with a user's request to change personal information associated with one of a financial account or a customer profile account.

39. The computer program product of claim 33, wherein the third set of codes is further configured to cause the computer to receive financial account balance inquiry data associated with a user requesting a balance for one or more financial accounts.

40. The computer program product of claim 33, wherein the third set of codes is further configured to cause the computer to receive event location-identifying data that provides for identifying a geographic location of an event associated with the event data.

41. The computer program product of claim 33, wherein the first set of codes is further configured to cause the computer to receive financial transaction attribute data associated with at least one of a plurality of financial institution transaction products, a plurality of financial institution transaction channels or a plurality of financial institution transaction applications.

42. The computer program product of claim 33, further comprising a sixth set of codes for causing a computer to receive related account data that identifies related financial accounts that are associated by customer name with each of the one or more financial accounts and a seventh set of codes for causing a computer to execute a third stage fraud filtration configured to evaluate the financial transactions based on the related account data.

43. The computer program product of claim 33, further comprising a sixth set of codes for causing a computer to receive customer data for a customer associated with each of the one or more customer financial accounts and a seventh set of codes for causing a computer to execute a third stage fraud filtration configured to evaluate the financial transactions based on the customer data.

44. The computer program product of claim 33, further comprising a sixth set of codes for causing a computer to execute a third stage fraud filtration configured to evaluate the one or more events based on the financial transaction data and a seventh set of codes for causing a computer to execute a fourth stage fraud filtration configured to evaluate the one or more events based on the account event data.

45. The computer program product of claim 33, wherein the fifth set of codes is further configured to cause the computer to determine which of the financial transactions warrant automatic generation and communication of a fraud alert.

46. The computer program product of claim 33, wherein the fifth set of codes is further configured to cause the computer to determine which of the financial transactions warrant further filtering.

47. The computer program product of claim 33, wherein the fifth set of codes is further configured to cause the computer to determine which of the financial transactions warrant fraud detection-related scoring.

48. The computer program product of claim 33, wherein the low risk or no risk transaction is a transaction that is not likely to be fraudulent and includes one of at least a transaction involving a low value transaction, a secure channel transaction, and a preferred customer transaction.

* * * * *